US008861723B2

(12) United States Patent
Kambayashi et al.

(10) Patent No.: US 8,861,723 B2
(45) Date of Patent: Oct. 14, 2014

(54) STORAGE DEVICE, ACCESS DEVICE, AND PROGRAM PRODUCT

(75) Inventors: Toru Kambayashi, Kanagawa (JP); Tatsuyuki Matsushita, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 220 days.

(21) Appl. No.: 13/232,187

(22) Filed: Sep. 14, 2011

(65) Prior Publication Data

US 2012/0114120 A1    May 10, 2012

(30) Foreign Application Priority Data

Nov. 5, 2010    (JP) .................................. 2010-249004

(51) Int. Cl.
*H04L 29/06*    (2006.01)
*H04L 9/08*    (2006.01)

(52) U.S. Cl.
CPC ......... *H04L 9/0897* (2013.01); *H04L 2209/603* (2013.01); *H04L 9/0844* (2013.01)
USPC ............................................. 380/44; 713/193

(58) Field of Classification Search
USPC ............ 380/44, 200–202, 277; 713/168–170, 713/193
See application file for complete search history.

(56) References Cited

U.S. PATENT DOCUMENTS

| 2002/0111925 | A1* | 8/2002 | Kambayashi ................... 706/45 |
| 2002/0141577 | A1* | 10/2002 | Ripley et al. ................... 380/201 |
| 2004/0151312 | A1* | 8/2004 | Yanagisawa .................... 380/45 |
| 2007/0192633 | A1* | 8/2007 | Strom et al. ................... 713/193 |
| 2009/0097656 | A1* | 4/2009 | Choi .............................. 380/277 |
| 2009/0100530 | A1* | 4/2009 | Chen .............................. 726/29 |
| 2009/0232314 | A1* | 9/2009 | Kato et al. ..................... 380/278 |
| 2010/0049993 | A1* | 2/2010 | Okaue et al. ................... 713/193 |
| 2010/0199129 | A1* | 8/2010 | Kitani .............................. 714/25 |
| 2010/0268953 | A1 | 10/2010 | Matsukawa et al. |
| 2011/0131470 | A1 | 6/2011 | Kambayashi et al. |
| 2011/0246791 | A1 | 10/2011 | Kambayashi et al. |

FOREIGN PATENT DOCUMENTS

| CN | 101866668 A | 10/2010 |
| JP | 10-301492 A | 11/1998 |
| JP | 2002-297032 A | 10/2002 |

(Continued)

OTHER PUBLICATIONS

U.S. Appl. No. 13/035,151, filed Feb. 25, 2011, Kambayashi.

(Continued)

*Primary Examiner* — Joseph P. Hirl
*Assistant Examiner* — Chi Nguy
(74) *Attorney, Agent, or Firm* — Oblon, Spivak, McClelland, Maier & Neustadt, L.L.P.

(57) ABSTRACT

In general, according to one embodiment, a storage device includes a data storage, a key storage, a receiver, an acquisition unit, a first computing unit, and a second computing unit. The data storage stores therein data. The key storage stores therein a plurality of device keys. The receiver receives identification information on an access device that accesses the data. The acquisition unit acquires an index specifying one of the device keys stored in the key storage. The first computing unit computes a second key based on the device key specified by the index and the identification information, the second key being used to perform an operation on key information acquired by performing an operation on a first key shared with the access device. The second computing unit computes the first key by performing an operation on the key information using the second key.

18 Claims, 23 Drawing Sheets

(56) References Cited

FOREIGN PATENT DOCUMENTS

| JP | 2003-22609 A | 1/2003 |
|---|---|---|
| JP | 2004-208088 A | 7/2004 |
| JP | 2006-253822 | 9/2006 |
| JP | 3957978 | 8/2007 |
| JP | 2008-35397 A | 2/2008 |

OTHER PUBLICATIONS

"Content Protection for Recordable Media Specification", CPRM Specification: SD Memory Card Book Common Part, 4C Entity, LLC, Revision 0.961, May 3, 2007, 18 pages.

Dalit Naor, et al., "Revocation and Tracing Schemes for Stateless Receivers", http://eprint.iacr.org/, Jul. 2001, 11 pages.

"3.2.2 Calculation of Subsidiary Device Keys and Processing Keys", Advanced Access Content System (AACS), Introduction and Common Cryptographic Elements Book, Final Revision 0.952, Jul. 14, 2011, pp. 1-48.

Debby M. Wallner, et al., "RFC 2627—Key Management for Multicast: Issues and Architectures", The Internet Society, http://www.faqs.org/rfcs/rfc2627.html, Jun. 1999, 19 pages.

Japanese Office Action issued Oct. 16, 2012 in Patent Application No. 2010-249004 with English Translation.

Toru Kamibayashi et al., JetJigsaw: Proposal for Copyright Protection Using P2P ("JetJigsaw: P2P New Proposal of Digital Rights Management System Using Peer to Peer Network"),(JetJigsaw: P2P wo riyoushita chosakukenhogo no shinteian), 2009, Symposium on Cryptography and Informatio Security, The Institute of Electronics, Information and Communication Engineers, Information Security Society, Jan. 23, 2009, pp. 1-6.

Taku Kato et al., "Content Protection Technology Applied to HD DVD", Toshiba Review, Toshiba Corporation, vol. 62, No. 7, Jul. 1, 2007, pp. 11-14.

* cited by examiner

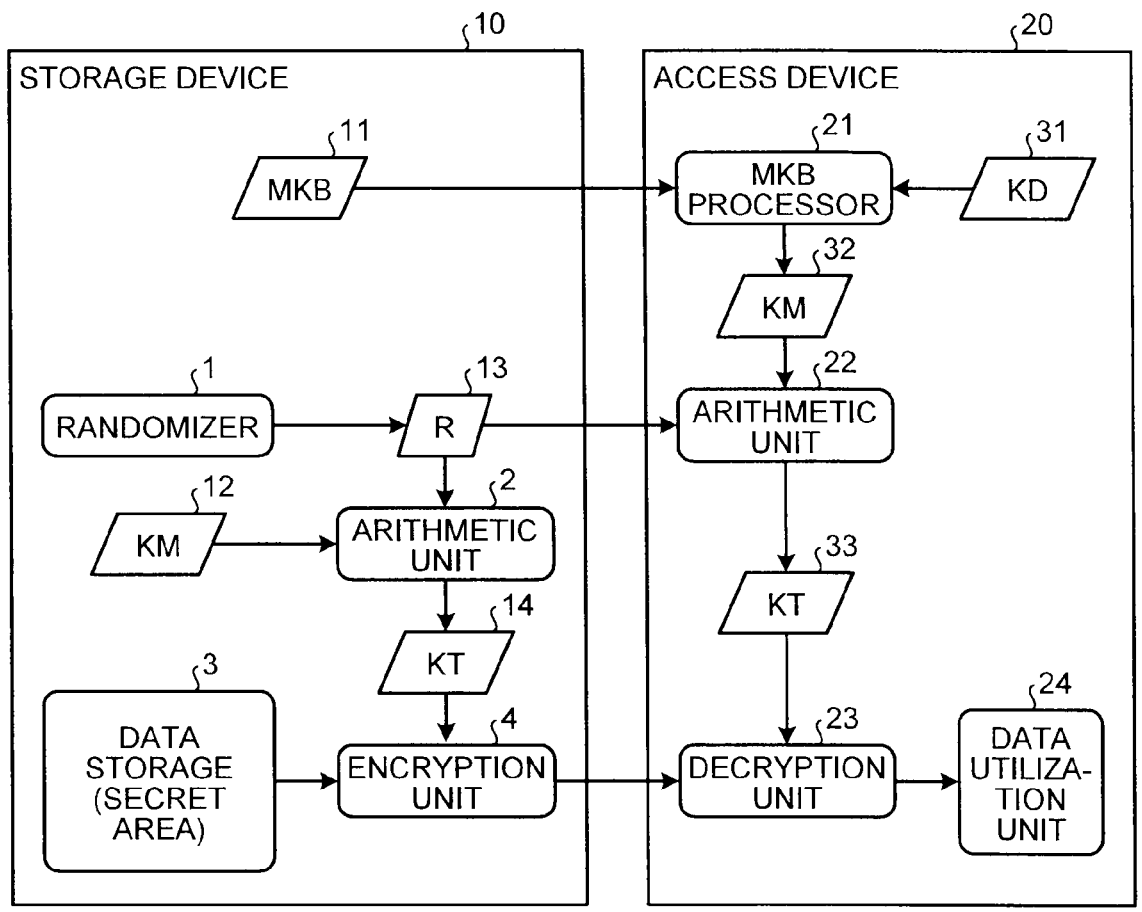

FIG.7

| DEVICE NUMBER | INDEX |
|---|---|
| 1 | (0,0,0,0,0) |
| 2 | (0,0,0,1,0) |
| ... | ... |
| 1000 | (1,0,2,0,1) |
| ... | ... |
| 10033 | (1,0,1,2,0) |

SET Suv OF LEAVES BELONGING    : S(15,14), S(15,10), S(15,2),
TO LEAF "1"                      S(13,10), S(13,2), S(9,2)

DEVICE KEY PROVIDED TO DEVICE  : k(15,14), k(15,10), k(15,2),
CORRESPONDING TO LEAF "1"        k(13,10), k(13,2), k(9,2)
                                 (+root key)

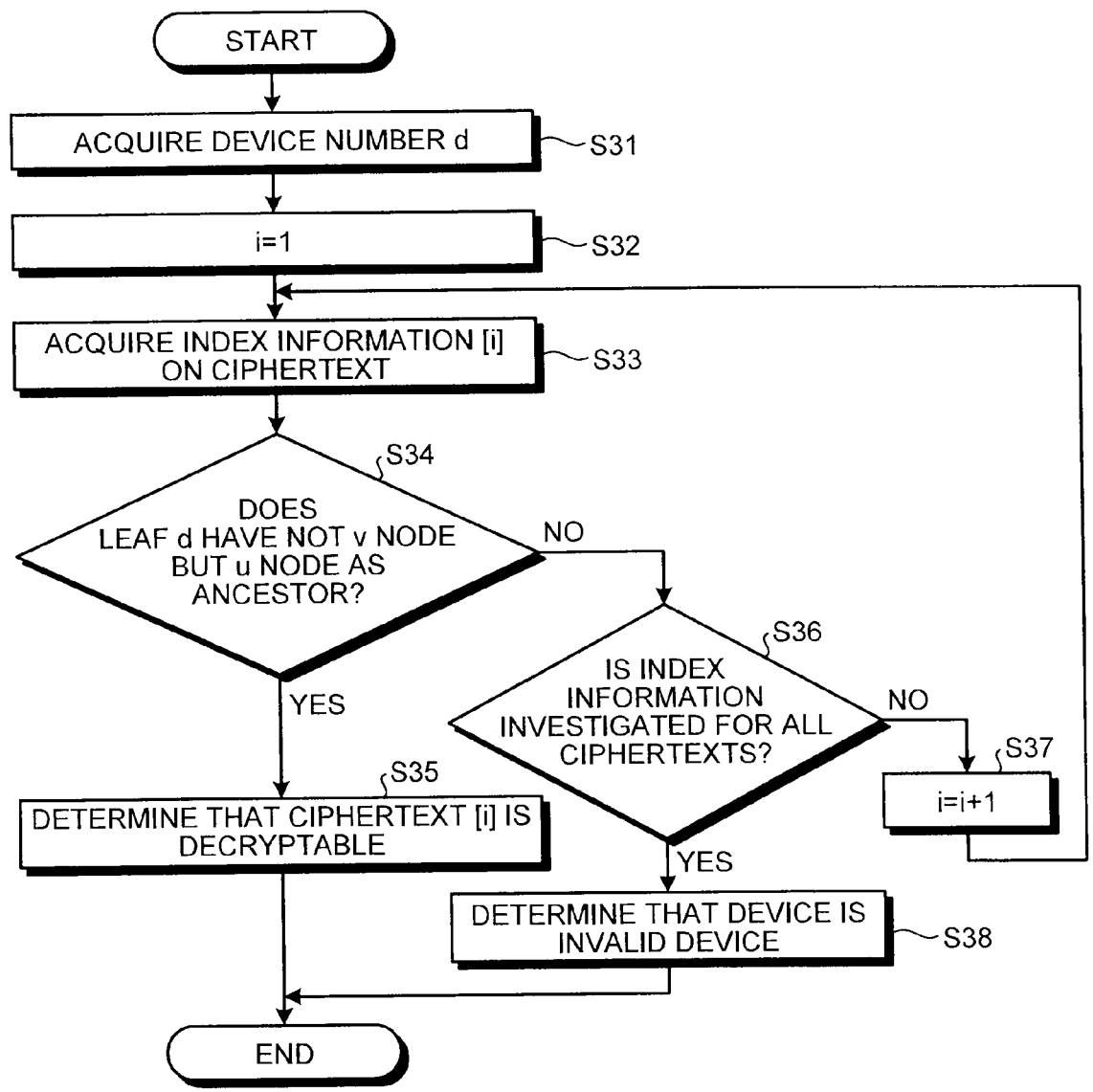

FIG.19A
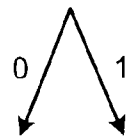
FIG.19B
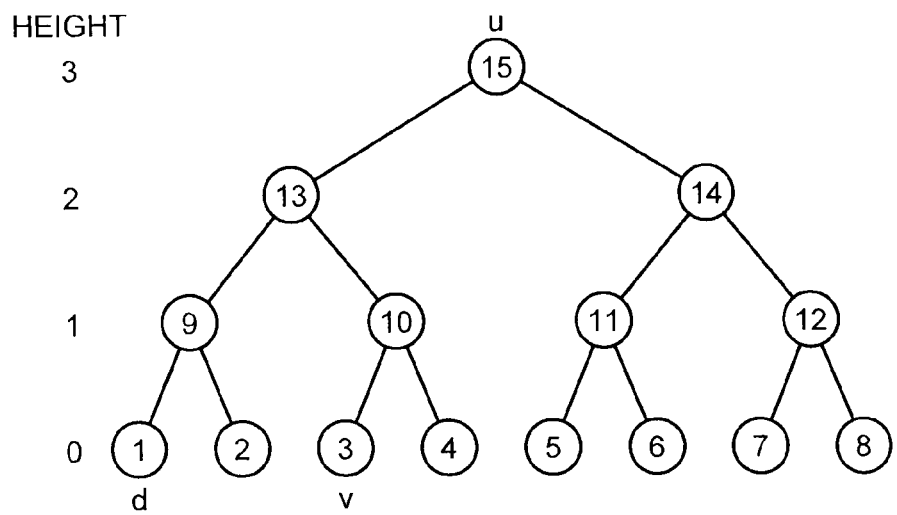
FIG.19C
| d | "1" | 0001 |
|---|---|---|
| V | v NODE="3" | 0101 |
| U | u NODE="15" | 1000 |
FIG.20
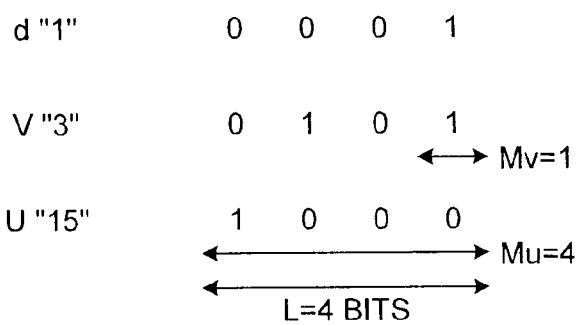

STORAGE DEVICE, ACCESS DEVICE, AND PROGRAM PRODUCT

CROSS-REFERENCE TO RELATED APPLICATIONS

This application is based upon and claims the benefit of priority from Japanese Patent Application No. 2010-249004, filed on Nov. 5, 2010; the entire contents of which are incorporated herein by reference.

FIELD

Embodiments described herein relate generally to a storage device, an access device, and a program product.

BACKGROUND

There is well known a technology what is called a Media Key Block (MKB). A unique key ring (device key) is allocated to each of many devices. Common data called the MKB is distributed to each device. Each device processes the MKB using the device key allocated to the device. As a result of the MKB processing, each device acquires data called a media key. An arbitrary number of designated devices can be revoked using the MKB. For example, the MKB can be configured such that a device 8 and a device 21 are revoked. In this case, the media key is not acquired even if the MKB is processed using the device key retained by the device 8. The same holds true for the device 21.

The device key allocated to each device can individually be revoked using the technology of the MKB. The revoke can efficiently be made by a combination of the device keys to be revoked. Utilizing such a feature, the MKB is applied to a copyright protection technology. For example, a situation can be considered in which encrypted contents are illegally decrypted by illegally analyzing a sequence of devices having device keys and therefore the plain-text contents are leaked. Such illegal leak of the contents takes place in the case in which the media key is easily read from the outside because a sequence of devices produced by a certain manufacturer is short of robustness, for example.

If an owner of copyright of contents or an agent thereof learns the fact of the illegal leak, the owner of copyright of contents or the agent thereof distributes the MKB that revokes the sequence of devices having the device keys. Therefore, the sequence of devices are revoked and the media key cannot be derived in the revoked devices. In the case in which the media key derived from the MKB is utilized to decrypt the encrypted contents, the encrypted contents cannot be decrypted in the revoked device. The leak of contents from the sequence of devices having the problem with the robustness can be prevented by updating the MKB.

BRIEF DESCRIPTION OF THE DRAWINGS

FIG. 1 is a block diagram of a storage device and an access device, which implement authentication key sharing using an MKB;

FIG. 2 is a view illustrating an example of a generator matrix;

FIG. 7 is a view illustrating an example of a data structure of a device number table;

FIG. 18 is a flowchart illustrating ciphertext determination processing;

FIGS. 19A to 19C are views illustrating the ciphertext determination processing;

FIG. 20 is a view illustrating a technique of determining whether the ciphertext can be decrypted;

DETAILED DESCRIPTION

Figure 3:
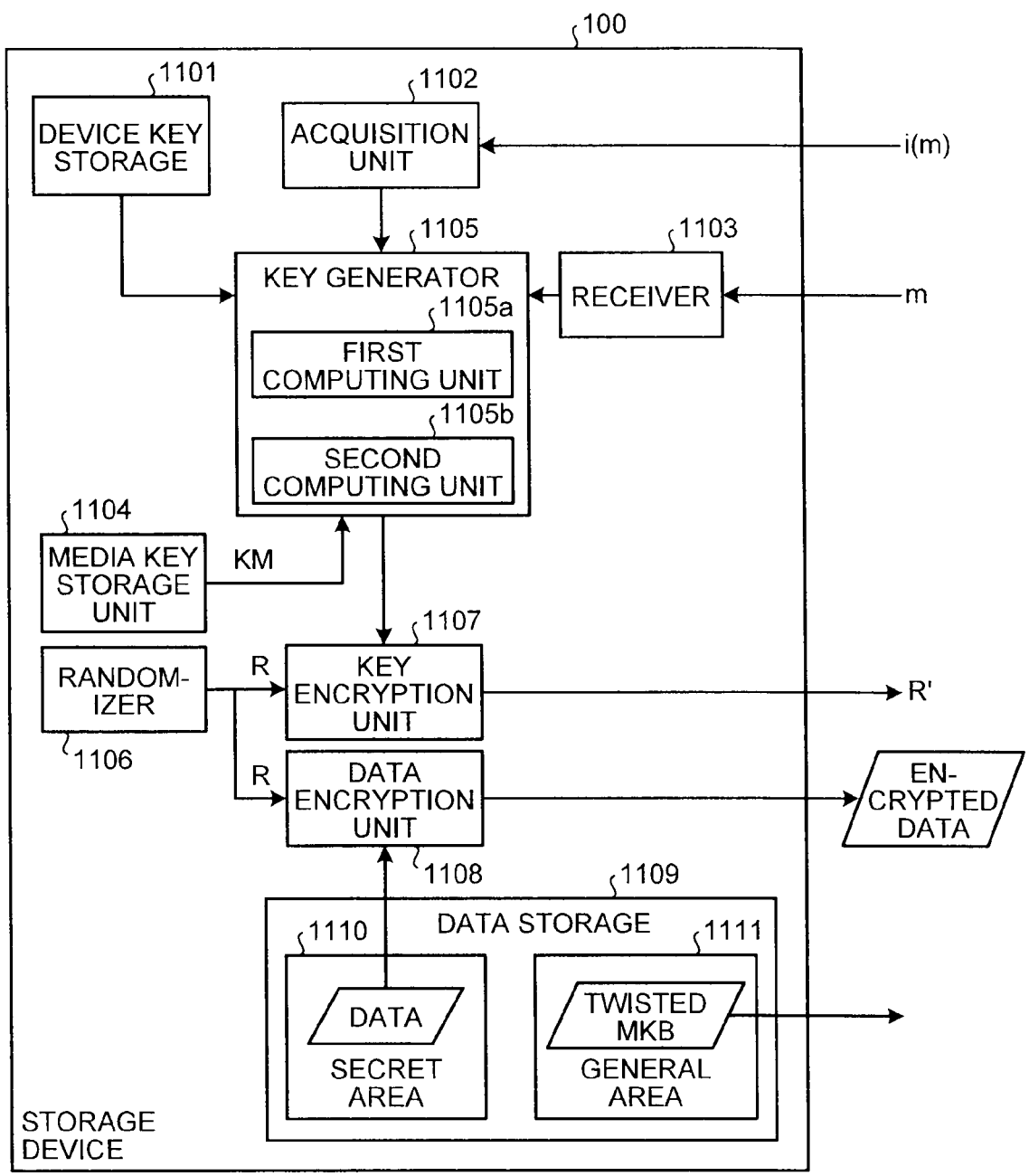
FIG. 3 is a block diagram of a storage device according to a first embodiment.

In general, according to one embodiment, a storage device includes a data storage, a key storage, a receiver, an acquisition unit, a first computing unit, and a second computing unit. The data storage stores therein data. The key storage stores therein a plurality of device keys. The receiver receives identification information on an access device that accesses the data. The acquisition unit acquires an index specifying one of the device keys stored in the key storage. The first computing unit computes a second key based on the device key specified by the index and the identification information, the second key being used to perform an operation on key information acquired by performing an operation on a first key shared with the access device. The second computing unit computes the first key by performing an operation on the key information using the second key.

Hereinafter, a storage device according to an embodiment will be described in detail with reference to the drawings.

First Embodiment

FIG. 1 is a block diagram illustrating an example of a configuration of a storage device 10 and an access device 20, which implement authentication key sharing using an MKB.

As illustrated in FIG. 1, the storage device 10 includes an MKB 11, a media key (KM) 12, a randomizer 1, an arithmetic unit 2, a data storage 3, and an encryption unit 4. The randomizer 1 generates a random number (R) 13. The arithmetic unit 2 inputs the KM 12 and the R 13 to a predetermined one-way function to compute a KT 14 that is of an authentication key shared with an access device 20. The data storage 3 is one in which data is stored, and the data storage 3 includes a secret area. The encryption unit 4 encrypts the data read from the data storage 3 using the KT 14.

The access device 20 includes a device key (KD) 31, an MKB processor 21, an arithmetic unit 22, a decryption unit 23, and a data utilization unit 24. The MKB processor 21 processes the MKB 11 using the KD 31 to perform MKB processing of deriving a media key (KM) 32. The arithmetic unit 22 inputs the KM 12 and the R 13 to the same one-way function as the arithmetic unit 2 to compute a KT 33 that is of an authentication key. In the case of normal processing, the KT 14 and the KT 33 are matched with each other. The decryption unit 23 decrypts the data encrypted by the encryption unit 4 using the KT 33. The data utilization unit 24 utilizes the decrypted data.

For example, by the storage device 10 and the access device 20, which are configured as illustrated in FIG. 1, the authentication key sharing using the MKB is implemented as follows. As illustrated in FIG. 1, the data read from the data storage 3 of the storage device 10 is encrypted using the KT 14. The read data is not correctly decrypted unless the access device 20 derives the same KT 33 as the KT 14. In order that the access device 20 derives the same KT 33 as the KT 14, it is necessary for the access device 20 to process the MKB to acquire the correct KM 32 using the KD 31 possessed by the access device 20. In the case in which the KD 31 is revoked by the MKB 11, the MKB processor 21 of the access device 20 incorrectly acquires the KM 32 through the MKB processing. Accordingly, the access device 20 incorrectly decrypts the data read from the storage device 10. Thus, the secret of the data in the data storage 3 of the storage device 10 is implemented.

Japanese Patent No. 3957978 discloses an example of a specific method of configuring an MKB and a device key. An example of the method of configuring the MKB and the device key will briefly be described below.

A generator matrix illustrated in FIG. 2 is prepared. Each of components k(0,0) to k(4,2) of the generator matrix is 16-byte data. It is assumed that D is a whole of a permutation in which five of a number of 0, a number of 1, or a number of 2 are arrayed (D={0,1,2}^5). An element of D is called a route. A partial permutation including a head of the route is referred to as a route associated with the route (associated route). For example, x=(2,0,2,2,1) is the route, and the associated routes of the route x are (2), (2,0), (2,0,2), (2,0,2,2), and (2,0,2,2,1). One route that is of the element of D is allocated to each device. A key ring that is fixed by the generator matrix and the associated route of the route allocated to each device is stored in the device. For example, the key ring indicated by the following expression (1) is stored in a device x (the device to which the route x is allocated).

$$\{PF(2),PF(2,0),PF(2,0,2),PF(2,0,2,2),PF(2,0,2,2,1)\} \quad (1)$$

For example, a function PF is defined by the following equation (2).

$$PF(n)=k(0,n),$$
$$PF(n0,n1)=G(k(1,n1),PF(n0)),$$
$$PF(n0,n1,n2)=G(k(2,n2),PF(n0,n1)),$$
$$PF(n0,n1,n2,n3)=G(k(3,n3),PF(n0,n1,n2)),$$
$$PF(n0,n1,n2,n3,n4)=G(k(4,n4),PF(n0,n1,n2,n3)) \quad (2)$$

Where G is a one-way function. The key ring is the device key allocated to the device x.

It is assumed that KM is a 16-byte media key. In the case in which a terminal to be revoked does not exist, a set M1 of pieces of data indicated by the following equation (3) is distributed as the MKB.

$$M1=\{E(k(0,0),KM),E(k(0,1),KM),E(k(0,2),KM)\} \quad (3)$$

Where E(k,X) is encrypted data acquired as a result of encrypting data X using a key k.

The MKB that revokes the device x=(2,0,2,2,1) is configured as follows. A boundary set of the device x is a set indicated by the following expression (4).

$$\{(0),(1),(2,1),(2,2),(2,0,0),(2,0,1),(2,0,2,0),(2,0,2,1),$$
$$(2,0,2,2,0),(2,0,2,2,2)\} \quad (4)$$

An M2 is fixed as a data set indicated by the following equation (5).

$$M2=\{$$
$$E(PF(0),KM),$$
$$E(PF(1),KM),$$
$$E(PF(2,1),KM),$$
$$E(PF(2,2),KM),$$
$$E(PF(2,0,0),KM),$$
$$E(PF(2,0,1),KM),$$
$$E(PF(2,0,2,0),KM),$$
$$E(PF(2,0,2,1),KM),$$
$$E(PF(2,0,2,2,0),KM),$$
$$E(PF(2,0,2,2,2),KM)\} \quad (5)$$

As described above, the key ring {PF(2),PF(2,0),PF(2,0,2),PF(2,0,2,2),PF(2,0,2,2,1)} of the expression (1) is stored in the device x. However, the device x cannot correctly acquire the KM even if any element of the M2 is decrypted using any key in the key ring. Accordingly, the device x is revoked.

Additionally, the devices except the device x can correctly acquire the KM by decrypting a proper element of the M2. A route y different from the route x is considered. When 0 or 1 is a first element of the route y, PF(0) or PF(1) is stored in a device y (device to which the route y is allocated). Accordingly, the KM is acquired by decrypting E(PF(0),KM) or E(PF(1),KM), which is of the element of the M2. When 1 or 2 is a second element of the route y while 2 is the first element, PF(2,1) or PF(2,2) is stored in the device y. Accordingly, the KM is acquired by decrypting E(PF(2,1),KM) or E(PF(2,2), KM), which is of the element of the M2. Thus, for any device y different from the device x, the KM can be acquired by decrypting one of the elements of the M2 using any key included in the key ring stored in the device y.

A method for configuring the MKB that revokes $x2=(1,1,0,0,2)$ in addition to $x=(2,0,2,2,1)$ will be described below. A boundary set between x and x2 is indicated by the following expression (6).

$$\{(0),(1),(2,1),(2,2),(1,0),(1,2),(2,0,0),(2,0,1),(1,1,1),(1,1,2),(2,0,2,0),(2,0,2,1),(1,1,0,1),(1,1,0,2),(2,0,2,2,0),(2,0,2,2,2),(1,1,0,0,0),(1,1,0,0,1)\} \quad (6)$$

Accordingly, an M3 that is of the MKB revoking x and x2 is given by the following equation (7).

$$M3=\{$$
$$E(PF(0),KM),$$
$$E(PF(1),KM),$$
$$E(PF(2,1),KM),$$
$$E(PF(2,2),KM),$$
$$E(PF(1,0),KM),$$
$$E(PF(1,2),KM),$$
$$E(PF(2,0,0),KM),$$
$$E(PF(2,0,1),KM),$$
$$E(PF(1,1,1),KM),$$
$$E(PF(1,1,2),KM),$$
$$E(PF(2,0,2,0),KM),$$
$$E(PF(2,0,2,1),KM),$$
$$E(PF(1,1,0,1),KM),$$
$$E(PF(1,1,0,2),KM),$$
$$E(PF(2,0,2,2,0),KM),$$
$$E(PF(2,0,2,2,2),KM),$$
$$E(PF(1,1,0,0,0),KM),$$
$$E(PF(1,1,0,0,1),KM)\} \quad (7)$$

In the case in which the device key of a revoke target is a special combination, the revoke can efficiently be made by cutting down a size of the MKB. For example, it is considered that a group of device keys $(2,0,?,?,?)$ is revoked. At this point, the numerical value 0, 1, or 2 is substituted for "?". The MKB that revokes the $3^3=27$ devices is given by an M4 indicated by the following equation (8).

$$M4=\{E(PF(2,1),KM),E(PF(2,2),KM)\} \quad (8)$$

The identical media key (KM) is derived from the MKB in the authentication key sharing method of FIG. 1. Accordingly, the illegal leak of the data is hardly prevented in the case in which, as described above, the KM is acquired by illegally analyzing the access device while the illegally analyzed access device cannot be identified.

In the storage device of the first embodiment, while the device can be revoked using the MKB, a different authentication key is generated in each access device using identification information (device number) identifying the access device. Therefore, even if the access device (software) that illegally accesses the data is distributed, the illegal leak of the data can be avoided because the illegally analyzed access device can be identified.

FIG. 3 is a block diagram illustrating an example of a storage device 100 according to a first embodiment. As illustrated in FIG. 3, the storage device 100 includes a device key storage 1101, an acquisition unit 1102, a receiver 1103, a media key storage 1104, a key generator 1105, a randomizer 1106, a key encryption unit 1107, a data encryption unit 1108, and a data storage 1109.

The plural device keys are stored in the device key storage 1101 in a form of a matrix such as the generator matrix M of FIG. 2. The acquisition unit 1102 acquires (receives) an index (key index i(m)), which specifies one of device keys stored in the device key storage 1101, from an access device 200. The receiver 1103 receives a device number m allocated to the access device 200 from a transmitter 2104 (described later) of the access device 200. The media key KM is stored in the media key storage 1104.

The key generator 1105 generates an authentication key (hereinafter referred to as an authentication key KA) shared with the access device 200 from the generator matrix M, the key index i(m), and the device number m. The key generator 1105 includes a first computing unit 1105a and a second computing unit 1105b.

The first computing unit 1105a computes a route function value (described later) of the function PF from the device key specified by the key index i(m), and computes a decryption key Kd in which the computed value is twisted by the device number m.

The second computing unit 1105b computes the authentication key KA by decrypting the key information, in which the authentication key KA is encrypted, using the decryption key Kd. In the first embodiment, the second computing unit 1105b computes the authentication key KA by decrypting a media key KM', in which the media key KM is encrypted by the route function value, using the decryption key Kd.

The method for computing the authentication key (first key) is not limited to the decryption operation in which the decryption key is used. In the case of the key information acquired by performing operations on the authentication key, any method may be adopted as long as the authentication key is subject to operations using a key (second key) performing operations corresponding to the operations.

The randomizer 1106 generates a random number R. The key encryption unit 1107 encrypts the random number R using the authentication key KA.

The data accessible from the access device 200 is stored in the data storage 1109. The data storage 1109 includes a secret area 1110 and a general area 1111. The secret area 1110 is a data area that is not revoked, but the data area where only the access device 200 that can generate the authentication key KA can read the data. The general area 1111 is a data area where the data can be read while the authentication is not performed using the authentication key KA.

In the first embodiment, an MKB (hereinafter referred to as a twisted MKB) in which the MKB of FIG. 1 is twisted is stored in the general area 1111. A detailed data structure of the twisted MKB is described later.

The data encryption unit 1108 computes encrypted data $D'=E(R,D)$ by encrypting read target data (data D) stored in the secret area 1110 using the random number R.

Figure 4:
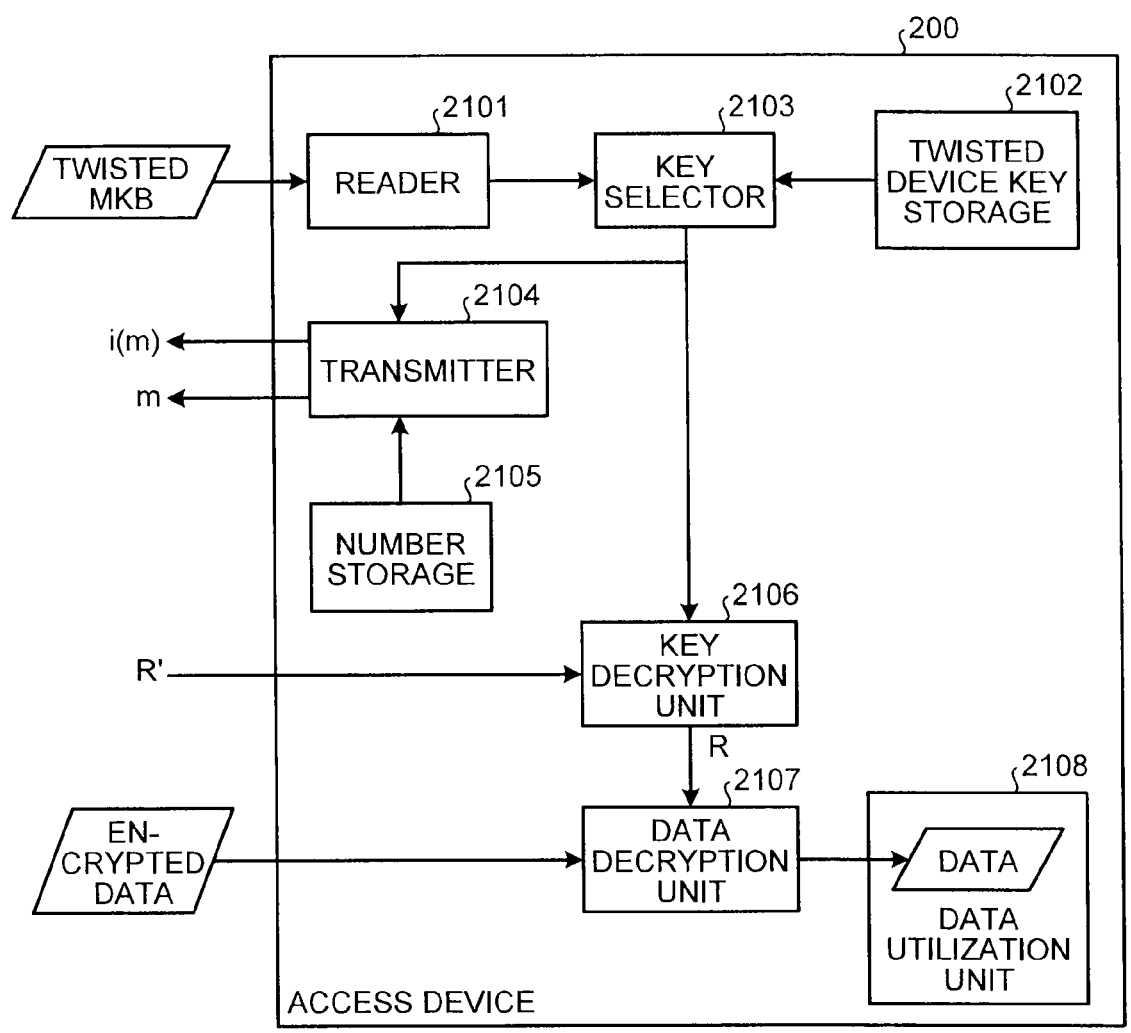
FIG. 4 is a block diagram of an access device of the first embodiment.

FIG. 4 is a block diagram illustrating an example of a configuration of the access device 200 of the first embodiment. As illustrated in FIG. 4, the access device 200 includes a reader 2101, a twisted device key storage 2102, a key selector 2103, the transmitter 2104, a number storage 2105, a key decryption unit 2106, a data decryption unit 2107, and a data utilization unit 2108.

The reader 2101 reads the twisted MKB from the general area 1111 of the storage device 100. Instead of transmitting the twisted MKB from the storage device 100 to the access device 200, the access device 200 may acquire the twisted MKB from the third party except the storage device 100.

Plural twisted device keys into which the plural device keys stored in the device key storage 1101 of the storage device 100 are twisted are stored in the twisted device key storage 2102. A detailed data structure of the twisted device key is described later.

The key selector 2103 selects the twisted device key corresponding to the twisted MKB from the plural twisted device keys and computes the authentication key KA from the selected twisted device key.

The transmitter 2104 transmits the key index i(m) specifying the selected decryption key Kd to the storage device 100. The device number m of the access device 200 is stored in the number storage 2105.

The key decryption unit 2106 decrypts the random number R from an encryption random number R' using the authentication key KA computed by the key selector 2103. The data decryption unit 2107 decrypts the data D from encrypted data D' using the random number R. The data utilization unit 2108 is a processor in which the data D is used. For example, the data utilization unit 2108 performs processing of displaying the data D on a display.

Figure 5:
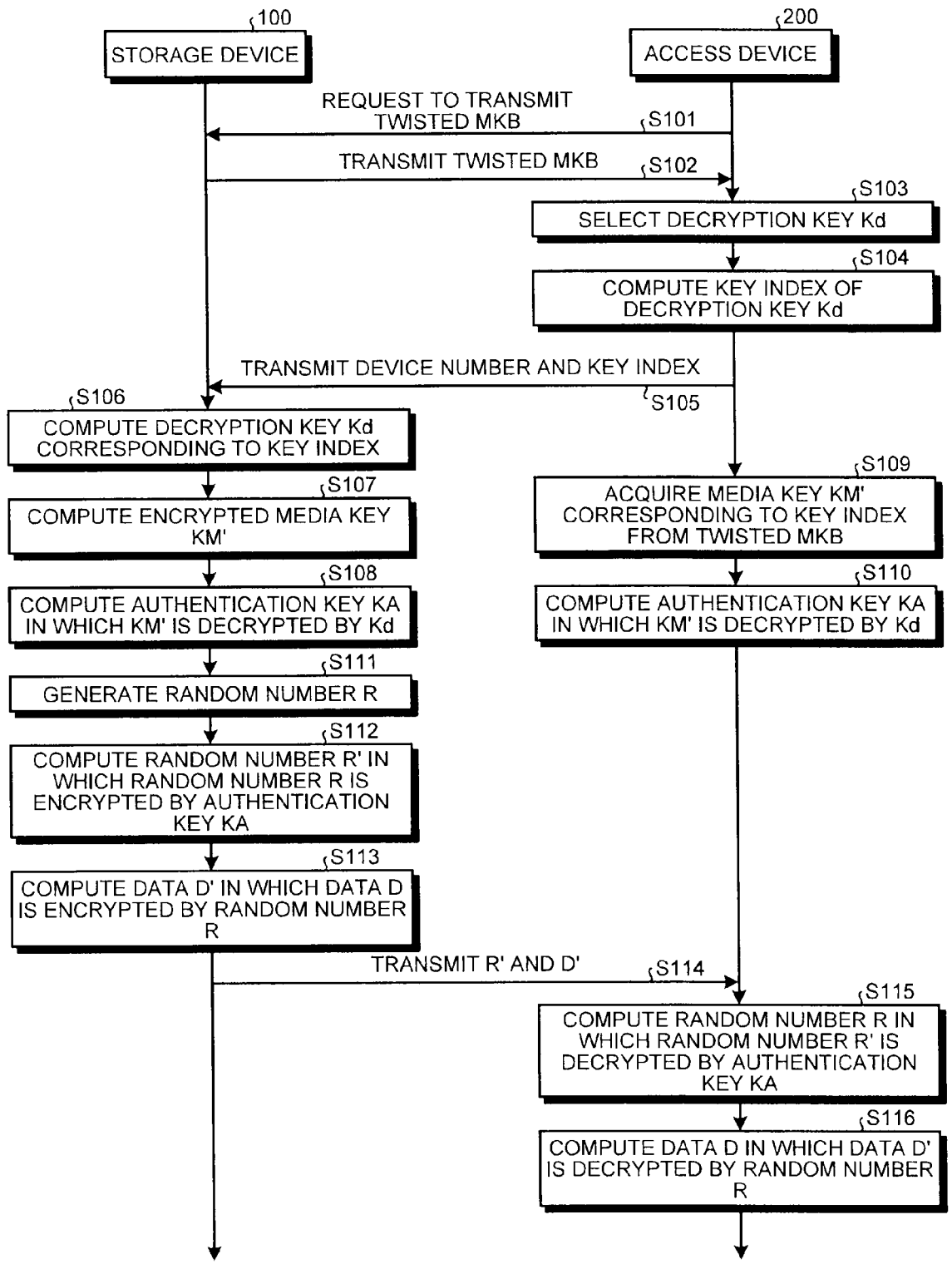
FIG. 5 is a sequence diagram of access processing of the first embodiment.

Access processing performed by the storage device 100 and the access device 200 of the first embodiment will be described below with reference to FIG. 5. FIG. 5 is a sequence diagram illustrating an entire flow of the access processing of the first embodiment.

The reader 2101 of the access device 200 requests to transmit the twisted MKB to the storage device 100 (Step S101). In response to the request, the storage device 100 reads the twisted MKB from the general area 1111 to transmit the twisted MKB to the access device 200 (Step S102).

The key selector 2103 of the access device 200 selects the twisted device key corresponding to the twisted MKB as the decryption key Kd from the plural twisted device keys stored in the twisted device key storage 2102 (Step S103). The key selector 2103 computes the key index i(m) that is of information specifying the selected decryption key Kd (Step S104). The transmitter 2104 transmits the computed key index i(m) and the device number m stored in the number storage 2105 to the storage device 100 (Step S105).

The acquisition unit 1102 of the storage device 100 receives the key index i(m) transmitted from the access device 200. The first computing unit 1105a of the key generator 1105 computes the route function value of the function PF from the device key specified by the key index i(m). The first computing unit 1105a computes the decryption key Kd in which the route function value is twisted by the device number m (Step S106).

The key generator 1105 computes the media key KM' in which the media key KM is encrypted by the route function value (Step S107). The second computing unit 1105b computes the authentication key KA by decrypting the media key KM' using the decryption key Kd (Step S108).

On the other hand, in the access device 200, the key selector 2103 acquires the media key KM' corresponding to the key index i(m) from the twisted MKB read by the reader 2101 (Step S109). The key selector 2103 computes the authentication key KA in which the acquired media key KM' is decrypted by the decryption key Kd selected in Step S103 (Step s110).

Therefore, each of the storage device 100 and the access device 200 can acquire the identical authentication key KA (Steps S108 and S110). Since then, various pieces of processing can be performed using the shared authentication key KA. By way of example, processing of reading the data from the secret area 1110 using the authentication key KA is described below. However, applicable processing is not limited to the processing of reading the data from the secret area 1110 using the authentication key KA. For example, in the case in which the access device 200 writes the data in the secret area 1110 of the storage device 100, the same processing as that of FIG. 5 can be applied to the processing until the authentication key KA is shared.

When the authentication key KA is computed in the storage device 100, the randomizer 1106 generates the random number R (Step S111). The key encryption unit 1107 computes the encryption random number R'. The encryption random number R' is a random number in which the random number R is encrypted using the authentication key KA (Step S112). The data encryption unit 1108 computes the encrypted data D'. The encrypted data D' is data in which the data D stored in the secret area 1110 is encrypted using the random number R (Step S113). The storage device 100 transmits the encryption random number R' and the encrypted data D' to the access device 200 (Step S114).

The key decryption unit 2106 of the access device 200 computes the random number R in which the received encryption random number R' is decrypted using the authentication key KA (Step S115). The data decryption unit 2107 computes the data D in which the received encrypted data D' is decrypted using the random number R (Step S116).

Through the above-described pieces of processing, the processing of accessing the secret area can be performed by the authentication key sharing in which the MKB technology is used.

A specific example of the access processing will further be described below. It is assumed that the route x=(2,0,2,2,1) is allocated to the access device 200.

The device number stored in the number storage 2105 is the numerical value allocated to the access device 200. Usually the different numerical value is allocated to each access device 200. Alternatively, a common numerical value may be allocated to a group of access devices 200. In the first embodiment, the device number is set to the numerical value that expresses the route allocated to the access device 200. That is, the device number m=20221_3=187 that is of the numerical value in which the route x=(2,0,2,2,1) is expressed in a ternary number is stored in the number storage 2105. As used herein, *_3 expresses that "*" is the ternary number.

The fact that the route is expressed in the ternary number means that the numerical values included in the route are regarded as the ternary number while arrayed from the left to the right in the order of permutation. The numerical value included in the route is not limited to 0, 1, or 2. The maximum value of the number of numerical values included in the route is not limited to 5. That is, the element of the set of whole permutations in which a group of "b" numerical values is arranged from a group of "a" numerical values can be configured to be set in the route ("a" and "b" are integers of 2 or more). In this case, the generator matrix becomes an a×b matrix. For example, the device number m may be set to a numerical value in which the route is expressed in a base a number. For example, in the case of a=2, the route is configured to include 0 or 1, and the numerical value in which the route is expressed in the binary number is configured to be set in the device number m.

It is assumed that the key ring indicated by the following expression (9) is stored in the twisted device key storage 2102.

$$\{G(m,PF(2)),G(m,PF(2,0)),G(m,PF(2,0,2)),G(m,PF(2,0,2,2)),G(m,PF(2,0,2,2,1))\} \quad (9)$$

The function PF is defined as the following equation (10). Where (+) is an exclusive OR in each bit.

$$PF(n0)=k(0,n0),$$

$$PF(n0,n1)=PF(n0)(+)k(1,n1),$$

$$PF(n0,n1,n2)=PF(n0,n1)(+)k(2,n2),$$

$$PF(n0,n1,n2,n3)=PF(n0,n1,n2)(+)k(3,n3),$$

$$PF(n0,n1,n2,n3,n4)=PF(n0,n1,n2,n3)(+)k(4,n4) \quad (10)$$

The equation (10) expresses an example in which the bit-by-bit exclusive OR is applied as the one-way function G of the equation (2). That is, the function PF is one (route function) that is defined for any route of the generator matrix M using the element of the generator matrix M.

G of the expression (9) is the one-way function, and G(m, X) expresses a result in which the one-way function is applied to a numerical value X using the device number m of the device (access device 200) that utilizes the data. The same bit-by-bit exclusive OR as the equation (10) may be used as the one-way function.

A set of suffixes of the stored key ring, which is indicated by the following expression (11), is also stored in the twisted device key storage 2102.

$$\{(2),(2,0),(2,0,2),(2,0,2,2),(2,0,2,2,1)\} \quad (11)$$

An example of the data structure of the twisted MKB will be described below. The twisted MKB includes MKB indices and an MKBase (Media Key base) corresponding to the MKB index.

The MKB index is a set of routes of the generator matrix M that revokes the device key. As described above, the device key and the route of the generator matrix M correspond to each other on a one-on-one basis. In the case in which the terminal to be revoked does not exist, the MKB index is indicated by the following expression (12).

$$\{0,1,2\} \quad (12)$$

For example, the MKB index that revokes the route y0=(1, 0,2,1,1) is indicated by the following expression (13).

$$\{(0),(2),(1,1),(1,2),(1,0,0),(1,0,1),(1,0,2,0),(1,0,2,2),(1,0,2,1,0),(1,0,2,1,2)\} \quad (13)$$

An example of a method for configuring the MKB index will be described below. In the first embodiment, the generator matrix M is a 3×5 matrix (3 rows and 5 columns). The same holds true for the general case in which the generator matrix M is an a×b matrix.

A set $\{(n0),(n0,n1),(n0,n1,n2),(n0,n1,n2,n3),(n0,n1,n2,n3,n4)\}$ of routes on the generator matrix M for the route x=(n0,n1,n2,n3,n4) is called an associated route set of the route x. Each route that is of the element of the associated route set is called an associated route. The associated route set of the route x is expressed by AP(X). The route in which the final numerical value of the route is different from that of each associated route is called boundary route, and a set of boundary routes is called a boundary route set. A boundary route set BP(X) of the route x=(n0,n1,n2,n3,n4) is given by the following equation (14).

$$BP(X)=\{(n)|n{\neq}n0\}\cup\{(n0,n)|n{\neq}n1\}\cup\{(n0,n1,n) \\ |n{\neq}n2\}\cup\{(n0,n1,n2,n)|n{\neq}n3\}\cup\{(n0,n1,n2,n3,n) \\ |n{\neq}n4\} \quad (14)$$

For example, the boundary route set of the route y0 is indicated by the following expression (15).

$$\{(0),(2),(1,1),(1,2),(1,0,0),(1,0,1),(1,0,2,0),(1,0,2,2),(1,0,2,1,0),(1,0,2,1,2)\} \quad (15)$$

The MKB index that revokes the route y0 is the boundary route set of y0.

It is considered that at least two routes are revoked.

DEFINITION (1) The associated route set AP(x1, x2, ..., xN) of the routes x1, x2, ..., xN is a sum of associated route sets of the routes x1, x2, ..., xN:

$$AP(x1, x2, ..., xN)=AP(x1)\cup AP(x2)\cup ... \cup AP(xN)$$

(2) The boundary route set BP(x1, x2, ..., xN) of the routes x1, x2, ..., xN is a difference set in which the associated route set of the routes x1, x2, ..., xN is removed from the sum of boundary route sets of the routes x1, x2, ..., xN:

$$BP(x1, x2, ..., xN)=BP(x1)\cup BP(x2)\cup ... \cup BP(xN)- \\ AP(x1, x2, ..., xN)$$

(3) The MKB index that revokes the routes x1, x2, ..., xN is the boundary route set BP(x1, x2, ..., xN) of the routes x1, x2, ..., xN.

For example, the boundary route sets of the route y0 and the route y1 are obtained as the route y1=(0,0,1,1,2). The boundary route sets of the route y0 and the route y1 become the expression (15) and the following expression (16).

$$\{(1),(2),(0,1),(0,2),(0,0,0),(0,0,2),(0,0,1,0),(0,0,1,2), \\ (0,0,1,1,0),(0,0,1,1,1)\} \quad (16)$$

Accordingly, the sum of the two boundary route sets is obtained by the following expression (17).

$$\{(0),(1),(2),(1,1),(1,2),(0,1),(0,2),(1,0,0),(1,0,1),(0,0, \\ 0),(0,0,2),(1,0,2,0),(1,0,2,2),(0,0,1,0),(0,0,1,2),(1, \\ 0,2,1,0),(1,0,2,1,2),(0,0,1,1,0),(0,0,1,1,1)\} \quad (17)$$

Accordingly, the boundary route sets of y0 and y1 become the following expression (18).

$$\{(2),(1,1),(1,2),(0,1),(0,2),(1,0,0),(1,0,1),(0,0,0),(0,0, \\ 2),(1,0,2,0),(1,0,2,2),(0,0,1,0),(0,0,1,2),(1,0,2,1, \\ 0),(1,0,2,1,2),(0,0,1,1,0),(0,0,1,1,1)\} \quad (18)$$

The boundary route set BP(y0,y1) is the MKB index that revokes the route y0 and the route y1.

A set S of routes revokes the routes x1, x2, ..., xN in the case in which the following two conditions hold.
i) AP(x1, x2, ..., xN)∩S=φ
ii) AP(y)∩S≠φ for any route y that is not included in {x1, x2, ..., xN}

It is proved below that the MKB index, namely, the boundary route set BP(x1, x2, ..., xN) is a set that revokes the routes x1, x2, ..., xN.

AP(x1, x2, ..., xN)∩BP(x1, x2, ..., xN)=0 is trivial from the definition of BP(x1, x2, ..., xN).

Any route that is not included in the {x1, x2, ..., xN} is set in the route y. AP(y) includes 5 routes having lengths 1 to 5. The length of the route (permutation) means the number of elements. For example, 3 is the length of (1,0,2). It is assumed that AP(y)={(n0),(n0,n1),(n0,n1,n2),(n0,n1,n2,n3),(n0,n1,n2,n3,n4)} holds. It is also assumed that AP(y)∩BP(x1, ..., xN)=φ holds. At this point, n0 is an initial element of one of x1, . . . , xN. Otherwise, (n0)∈BP(x1, . . . , xN) holds and conflicts with the assumption. (n0,n1) is matched with the permutation including any two initial elements of x1, . . . , xN. Otherwise, (n0,n1)∈BP(x1, . . . , xN) holds and conflicts with the assumption. By repeating the same inference, it is necessary that y=(n0, . . . , n4) be eventually matched with x1, . . . , xN. This contradicts the assumption that the route y is not included in {x1, x2, . . . , xN}. That is, AP(y)∩BP(x1, . . . , xN)≠φ holds when the route y is not included in {x1, x2, . . . , xN}. Therefore, it is proved that the MKB index revokes the routes x1, . . . , xN.

It is indicated below that the MKB index BP(x1, . . . , xN) is the minimum set that revokes the routes x1, . . . , xN.

It is assumed that ρ∈BP(x1, . . . , xN) holds. The route y is formed by properly elongating the route ρ to the length of 5. At this point, it is assumed that a route u∈AP(y)∩(BP(x1, . . . , xN)−{ρ}) holds. It is assumed that l(ρ) is a length of the route ρ, and it is assumed that l(u)<l(ρ) holds. Because of ρ∈BP(x1, . . . , xN), it is necessary that u∈AP(xi) hold for a certain number i. This contradicts the assumption. Letting l(u)=l(ρ) becomes u=ρ. This also contradicts the assumption. It is assumed that l(u)>l(ρ) holds. Assuming that u' is the route in which the final element of the route u is removed, a certain number j exist and it is necessary that u'∈AP(xj) hold by the definition of BP(x1, . . . , xN). Accordingly, ρ∈AP(xj) holds. This contradicts the assumption. Eventually, AP(y)∩(BP(x1, . . . , xN)−{ρ})=φ holds. Therefore, it is proved that BP(x1, . . . , xN) is the minimum set that revokes the routes x1, . . . , xN.

The base key will be described below. The base key is a set of pieces of data defined as follows. The MKB index is the set of routes of the generator matrix M, and the set of pieces of data defined for each route belonging to the MKB index using the route function PF and the media key KM is called the base key.

For example, the MKB index of the expression (18) is considered. The following expression (19) is an example of the base key for the MKB index.

{$E(PF(2),KM)$, $E(PF(1,1),KM)$, $E(PF(1,2),KM)$, $E(PF(0,1),KM)$, $E(PF(0,2),KM)$, $E(PF(1,0,0),KM)$, $E(PF(1,0,1),KM)$, $E(PF(0,0,0),KM)$, $E(PF(0,0,2),KM)$, $E(PF(1,0,2,0),KM)$, $E(PF(1,0,2,2),KM)$, $E(PF(0,0,1,0),KM)$, $E(PF(0,0,1,2),KM)$, $E(PF(1,0,2,1,0),KM)$, $E(PF(1,0,2,1,2),KM)$, $E(PF(0,0,1,1,0),KM)$, $E(PF(0,0,1,1,1),KM)$} (19)

The example of the expression (19) has the same data configuration as the MKB of the expressions (5) and (6).

In the first embodiment, one twisted MKB exists in one storage device 100. When the access device 200 reads the data from the secret area 1110 of the storage device 100, the reader 2101 reads the twisted MKB from the general area 1111 of the storage device 100 (Steps S101 and S102 of FIG. 5). The reader 2101 transmits the MKB index of the read twisted MKB to the key selector 2103. The key selector 2103 reads the twisted device key from the twisted device key storage 2102 to select the decryption key Kd (Step S103). The processing of selecting the decryption key Kd, which is performed by the key selector 2103 in Step S103, will be described in detail.

The MKB index is set to I_MKB and the set of suffixes stored in the twisted device key storage 2102 is set to I_D. The key selector 2103 checks whether I_MKB∩I_D≠φ holds. When I_MKB∩I_D=φ holds, the device key is revoked. In this case, the key selector 2103 stops the processing. On the other hand, when I_MKB∩I_D≠φ holds, the key selector 2103 finds the route u in which u∈I_MKB∩I_D holds. The key selector 2103 selects the key (in the twisted device keys) corresponding to the route u as the decryption key Kd. More specifically, the key selector 2103 performs the following operation. It is assumed that the MKB index (I_MKB) is indicated by the following equation (20).

$I\_MKB=\{(0),(2),(1,1),(1,2),(1,0,0),(1,0,1),(1,0,2,0),$
$(1,0,2,1,0),(1,0,2,1,2),(1,0,2,2,0),(1,0,2,2,2)\}$ (20)

The MKB index revokes the two routes y0 and y2 of the following equation (21).

$y0=(1,0,2,1,1)$ and $y2=(1,0,2,2,1)$ (21)

It is assumed that x0=(1,0,2,0,1) is the route allocated to the access device 200. At this point, the suffixes of the following equation (22) are stored in the twisted device key storage 2102 of the access device 200.

$I\_D=\{(1),(1,0),(1,0,2),(1,0,2,0),(1,0,2,0,1)\}$ (22)

The device key (ring) of the following equation (23) is also stored in the twisted device key storage 2102.

$D0=\{$ $G(100,PF(1))$, $G(100,PF(1,0))$, $G(100,PF(1,0,2))$, $G(100,PF(1,0,2,0))$, $G(100,PF(1,0,2,0,1))\}$ (23)

The device number m of the access device 200 is 100 that is acquired from 10201_3 expressed in the ternary number of the route x0. The key selector 2103 sequentially selects the suffix (route) of I_D to determine whether the suffix is included in I_MKB. The key selector 2103 selects the decryption key Kd using a function key_choice( ).

```
key_choice(I_D, I_MKB){
    int i,j;
        for (j = 0; j < 5; j++)
            for (i = 0; i < 11; i++)
```

-continued

```
            if (I_D[j] == I_MKB[i]){
                D0[j] is selected as the decryption
    key Kd;
                return j;
            }
        return -1;
}
```

As a result, $D0[3]=G(100,PF(1,0,2,0))$ is selected as the decryption key Kd for 1 MKB of the equation (20) and I_D of the equation (22).

In the case in which the y0 is the route allocated to the access device 200, the key ring (twisted device key) and the suffixes, which are allocated to the access device 200, are indicated by the following expression (24).

key ring: {

$G(103,PF(1))$, $G(103,PF(1,0))$, $G(103,PF(1,0,2))$, $G(103,PF(1,0,2,1))$, $G(103,PF(1,0,2,1,1))$}, suffix: $\{(1),(1,0),(1,0,2),(1,0,2,1),(1,0,2,1,1)\}$ (24)

The device number m of the access device 200 is $10211\_3=103$. For the access device 200, the function key_choice( ) cannot find the decryption key Kd, but the function key_choice( ) returns the numerical value of −1 and stops.

In the case in which the key selector 2103 can find the decryption key Kd, the key selector 2103 transmits the suffix of the found decryption key Kd to the transmitter 2104. The transmitter 2104 transmits the suffix as the key index i(m) to the storage device 100. In the above-described example, because (1,0,2,0) is the suffix of the decryption key Kd, the transmitter 2104 transmits the suffix (1,0,2,0) as the key index i(m) to the storage device 100 (Step S105). The key index depends on the device number m of the access device 200. Accordingly, the key index is represented by i(m). The key index is information specifying one of a first column to a cth column (c is an integer satisfying 1≤c≤b) of the a×b generator matrix.

Instead of transmitting the key index i(m), the key selector 2103 may transmit the length of the suffix of the found decryption key Kd to the transmitter 2104. In the example, because 4 is the length of the suffix (1,0,2,0) of the decryption key Kd, the transmitter 2104 transmits the numerical value of 4 as the key index to the storage device 100. In the storage device 100, the suffix of the decryption key Kd can be acquired along with the device number m that is separately acquired from the access device 200. Specifically, for example, the processing of acquiring the suffix is performed as follows.

It is assumed that the route $x0=(1,0,2,0,1)$ is allocated to the access device 200. At this point, the device number $10201\_3=100$ is stored in the number storage 2105 of the access device 200. When the storage device 100 receives the device number of $10201\_3$ and the key index of 4 from the access device 200, the four suffixes can be cut out from the device number expressed in the ternary number to obtain the suffix $(1,0,2,0)$ of the decryption key Kd. That is, the key index may be defined such that the storage device 100 acquires the suffix of the decryption key Kd by a combination of the key index and the device number of the access device 200.

Then the key selector 2103 reads the base key corresponding to the suffix of the decryption key Kd from the reader 2101. In the case in which (1,0,2,0) is the suffix of the decryption key Kd, the key selector 2103 acquires a key $KM'=E(PF(1,0,2,0),KM)$ that is of the corresponding base key from the twisted MKB read by the reader 2101 (Step S109). As indicated by the following equation (25), the key selector 2103 acquires the authentication key KA by decrypting the key KM' acquired using the decryption key Kd (Step S110). D(X, Y) expresses a decryption operation of decrypting Y by X.

$$KA=D(Kd,KM')\qquad(25)$$

On the other hand, in the storage device 100, the acquisition unit 1102 receives the key index i(m) from the access device 200. The acquisition unit 1102 transmits the key index i(m) to the key generator 1105. The key generator 1105 issues an instruction to read the device number m of the access device 200 to the receiver 1103. The receiver 1103 receives the device number m read from the number storage 2105 of the access device 200 and transmits the received device number m to the key generator 1105. The key generator 1105 reads the device key fixed by the generator matrix M from the device key storage 1101 and generates the authentication key KA corresponding to the key index i(m).

For example, in the case in which the generator matrix M is given as illustrated in FIG. 2, and in the case of $m=100=10201\_3$ and $i(m)=4$, the key generator 1105 acquires the authentication key KA through the following procedures i) to vi).

i) The suffix (1,0,2,0) of the decryption key Kd is acquired.
ii) The route function value $PF(1,0,2,0)=k(0,1)(+)k(1,0)(+)k(2,2)(+)k(3,0)$ is computed for the route fixed by the suffix.
iii) The decryption key $Kd=G(m,PF(1,0,2,0))=G(100,PF(1,0,2,0))$ is computed (Step S106).
iv) The media key KM is acquired from the media key storage 1104.
v) The media key KM is encrypted using the route function value PF(1,0,2,0) computed in ii), thereby acquiring the key KM' (Step S107): $KM'=E(PF(1,0,2,0),KM)$
vi) the key KM' is decrypted using the decryption key Kd acquired in iii), thereby acquiring the authentication key KA (Step S108): $KA=D(Kd,KM')$ The key generator 1105 transmits the computed authentication key KA to the key encryption unit 1107. The key encryption unit 1107 make a request to generate the random number to the randomizer 1106 and receives the random number R generated by the randomizer 1106 (Step S111). The key encryption unit 1107 encrypts the random number R using the authentication key KA (Step S112), and the key encryption unit 1107 transmits the encryption random number $R'=E(KA,R)$ that is of the encrypted random number R to the access device 200 (Step S114). E(KA,R) expresses the result of the encryption of random number R using the authentication key KA. On the other hand, the random number R is also transmitted from the randomizer 1106 to the data encryption unit 1108. In response to the read request from the access device 200, the data encryption unit 1108 acquires the encrypted data $D'=E(R,D)$ by encrypting the data D of the read target stored in the secret area 1110 using the random number R (Step S113). The data encryption unit 1108 transmits the encrypted data D' to the access device 200 (Step S114).

When receiving the encryption random number R', the access device 200 inputs the encryption random number R' to the key decryption unit 2106. The key decryption unit 2106 acquires the authentication key KA, which is previously computed by the key selector 2103, from the key selector 2103. The key decryption unit 2106 decrypts the encryption random number R' using the authentication key KA to acquire the random number R (Step S115): R=D(KA,R'). The key decryption unit 2106 transmits the acquired random number R to the data decryption unit 2107.

The data decryption unit 2107 makes the read request to the storage device 100. As described above, the data encryption unit 1108 of the storage device 100 outputs the encrypted data D' in response to the read request. The data decryption unit 2107 acquires the encrypted data D'. The data decryption unit 2107 decrypts the encrypted data D' using the random number R to acquire the data D of the read target (Step S116). The data decryption unit 2107 transmits the data D to the data utilization unit 2108. The data utilization unit 2108 utilizes the data D to display the data D on a screen.

As described above, the following functions are implemented in the first embodiment.

i) The twisted MKB includes the MKB index and the base key. In consideration of the specific generator matrix and the route on the generator matrix, the MKB index is configured using the boundary route set of the route of the revoke target. The base key is produced from the route function value of each route belonging to the MKB index and one or plural pieces of information called the media key stored in the storage device 100.

ii) The identification information (in the first embodiment, the device number) allocated to the access device 200 is stored in the access device 200, and the access device 200 transmits the identification information to the storage device 100 in reading the data from the secret area 1110 of the storage device 100 or writing the data in the secret area 1110.

iii) The generator matrix is stored in the storage device 100. The storage device 100 generates the authentication key using the generator matrix, the identification information acquired from the access device 200, and the media key stored in the storage device 100.

iv) The device key, which is fixed by the route (on the generator matrix) allocated to the access device 200 and computed using the route function value, is stored in the access device 200, and the device key is twisted using the identification information stored in the access device 200 (twisted device key).

v) The access device 200 computes the authentication key from the twisted device key and the base key.

vi) The storage device 100 and the access device 200 share the (common) authentication key, which is derived by each of the storage device 100 and the access device 200, and use the shared authentication key to encrypt the random number or the data.

In the first embodiment, the access device 200 is efficiently revoked by the MKB index like the usual MKB. Additionally, in the first embodiment, unlike the usual MKB, the authentication key (in the example, KA=D(G(100,PF(1,0,2,0)),E(PF(1,0,2,0),KM))) shared by the access device 200 and the storage device 100 differs from one access device 200 to another. Because the access devices 200 having the device numbers different from one another, the authentication key KA differs from one access device 200 to another. As a result, in case a certain access device 200 is illegally analyzed to expose the authentication key KA shared with the storage device 100, the authentication key KA cannot be used in another access device 200 having the different device key.

In the usual MKB, when the media key is learned for a certain MKB, the authentication of the access device 200 is completed by the storage device 100. For example, in the example of FIG. 1, the data can be read from the secret area (data storage 3) of the storage device 10 when the media key KM is possessed. The device key is not required in the case in which the authentication is performed by the usual MKB. Accordingly, the following scenario of the attack on the system is realized.

i) An adversary acquires the device key by analyzing the specific access device 200 (having the vulnerability).

ii) The adversary acquires the media key of the MKB stored in the storage device 100 using the illegally acquired device key.

iii) The adversary distributes the illegal access device 200 (software) including the illegally acquired media key. The illegal access device 200 can freely read the data from the secret area 1110 of the storage device 100. Because the illegal access device 200 does not have the device key, the device key of the illegally analyzed access device 200 cannot be identified by analyzing the illegal access device 200. Accordingly, the illegally analyzed access device 200 cannot be revoked by this method.

iv) Unless the device key of the illegally analyzed access device 200 is identified and revoked, the leak of the media key is continued with the access device 200 even if the MKB (and the media key) is updated.

On the other hand, in the first embodiment in which the twisted MKB is used, the authentication key KA computed by the specific access device 200 and the identification information of the access device 200 are required in order that the access device 200 accesses the secret area 1110 of the storage device 100. The identification information can be specified when the software including the pieces of information to illegally access the storage device 100 is distributed, so that the data utilization device (access device 200) assigned by the identification information can be revoked by distributing the new twisted MKB. Therefore, the leak of the authentication key from the data utilization device believed to be illegally analyzed can be prevented.

Thus, in the first embodiment, the illegal leak of the data from the secret area protected by the authentication and the encryption can be avoided.

Second Embodiment

In the first embodiment, the storage device receives the index (key index) of the decryption key computed by the access device, and the storage device computes the authentication key based on the key index. In a second embodiment, the storage device receives only the device number of the access device, and the storage device side computes the authentication key based on the device number.

Figure 6:
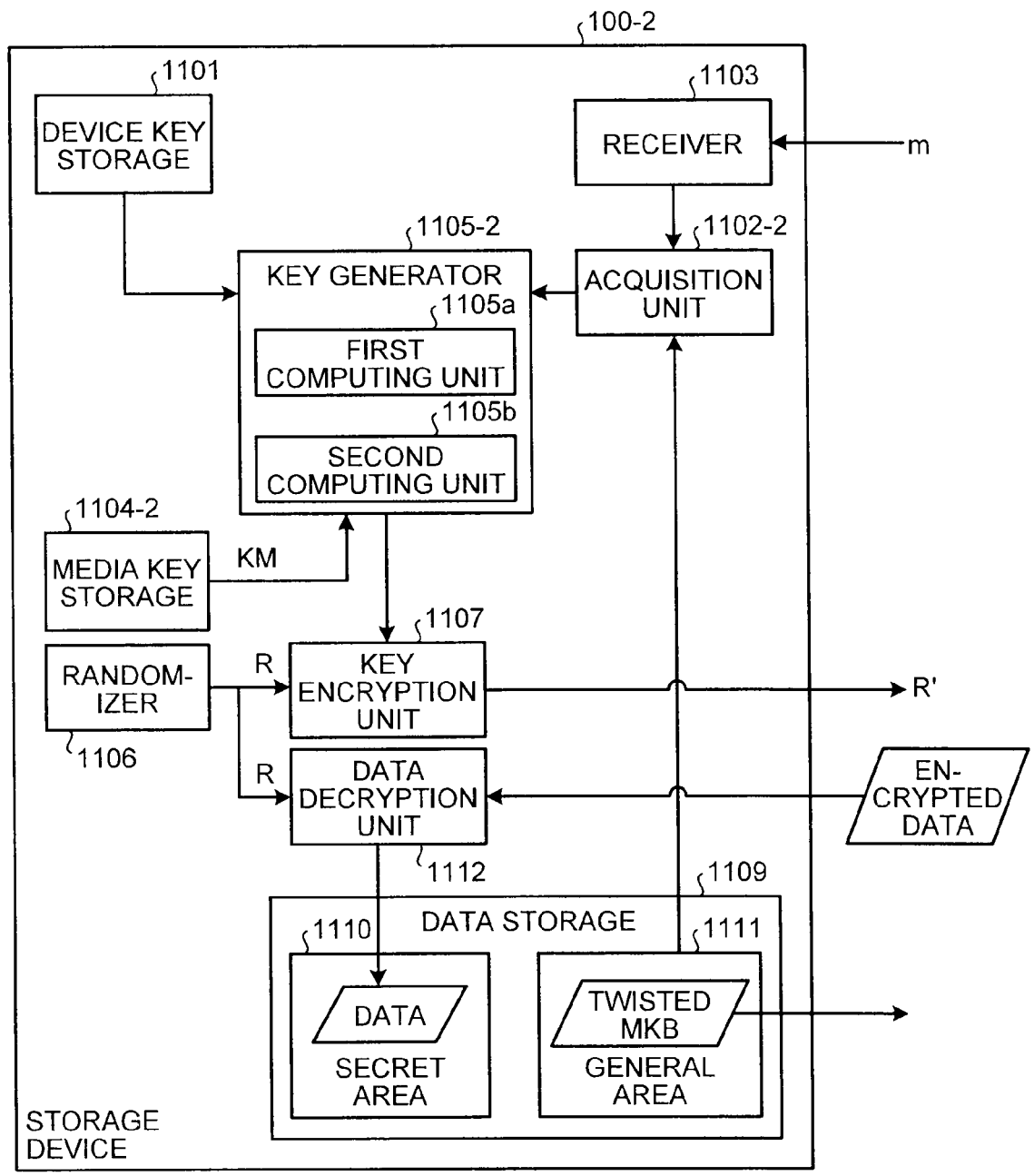
FIG. 6 is a block diagram of a storage device according to a second embodiment.

FIG. 6 is a block diagram illustrating an example of a configuration of a storage device 100-2 according to a second embodiment. As illustrated in FIG. 6, the storage device 100-2 includes a device key storage 1101, an acquisition unit 1102-2, a receiver 1103, a media key storage 1104-2, a key generator 1105-2, a randomizer 1106, a key encryption unit 1107, a data storage 1109, and a data decryption unit 1112.

The second embodiment differs from the first embodiment in that the functions of the acquisition unit 1102-2, the media key storage 1104-2, and the key generator 1105-2 and the data decryption unit 1112 are added and that the data encryption unit 1108 is eliminated. Because other configurations and functions are identical to those of the storage device 100 of the first embodiment of FIG. 3, other configurations and functions are designated by the same numeral, and the descriptions will not be repeated.

The data encryption unit 1108 is eliminated for the sake of convenience, and the storage device 100-2 may be configured to include the data encryption unit 1108. Similarly to the second embodiment, the storage device 100 of the first embodiment may be configured to include the data decryption unit 1112.

The acquisition unit 1102-2 differs from the acquisition unit 1102 of the first embodiment in that the key index i(m) is acquired by referring to the twisted MKB stored in the general area 1111 and the device number received by the receiver 1103. The twisted MKB having the data structure different from that of the first embodiment is used in the second embodiment. The detailed data structure of the twisted MKB of the second embodiment is described later.

The acquisition unit 1102-2 acquires the key index using a device number table. FIG. 7 is a view illustrating an example of the data structure of the device number table. As illustrated in FIG. 7, the device number and the route (index) of the twisted device key are stored in the device number table while correlated with each other. The acquisition unit 1102-2 may be configured to retain the device number table, or another storage such as the data storage 1109 may be configured to retain the device number table. The detailed processing in which the device number table is used is described later.

The media key storage 1104-2 differs from the media key storage 1104 of the first embodiment in that the plural media keys (in the second embodiment, {KM0,KM1,KM2,KM3,KM4}) are stored in the media key storage 1104-2.

The key generator 1105-2 differs from the key generator 1105 of the first embodiment in that the authentication key KA is generated from the plural media keys. Similarly to the first embodiment, one media key may be stored in the media key storage 1104-2. In this case, the key generator 1105-2 may generate the authentication key KA by the method similar to that of the key generator 1105 of the first embodiment.

The key generator 1105-2 includes the first computing unit 1105*a* and a second computing unit 1105*b*-2. The first computing unit 1105*a* has the function similar to that of the first embodiment.

The second computing unit 1105*b*-2 computes the authentication key KA by decrypting the media key using the decryption key Kd. In the second embodiment, the second computing unit 1105*b*-2 computes the authentication key KA by decrypting the key information corresponding to the key index in the pieces of information, which are computed from the plural media keys and stored as the base key of the twisted MKB.

The data decryption unit 1112 decrypts the data D from the encrypted data D' using the random number R.

Figure 8:
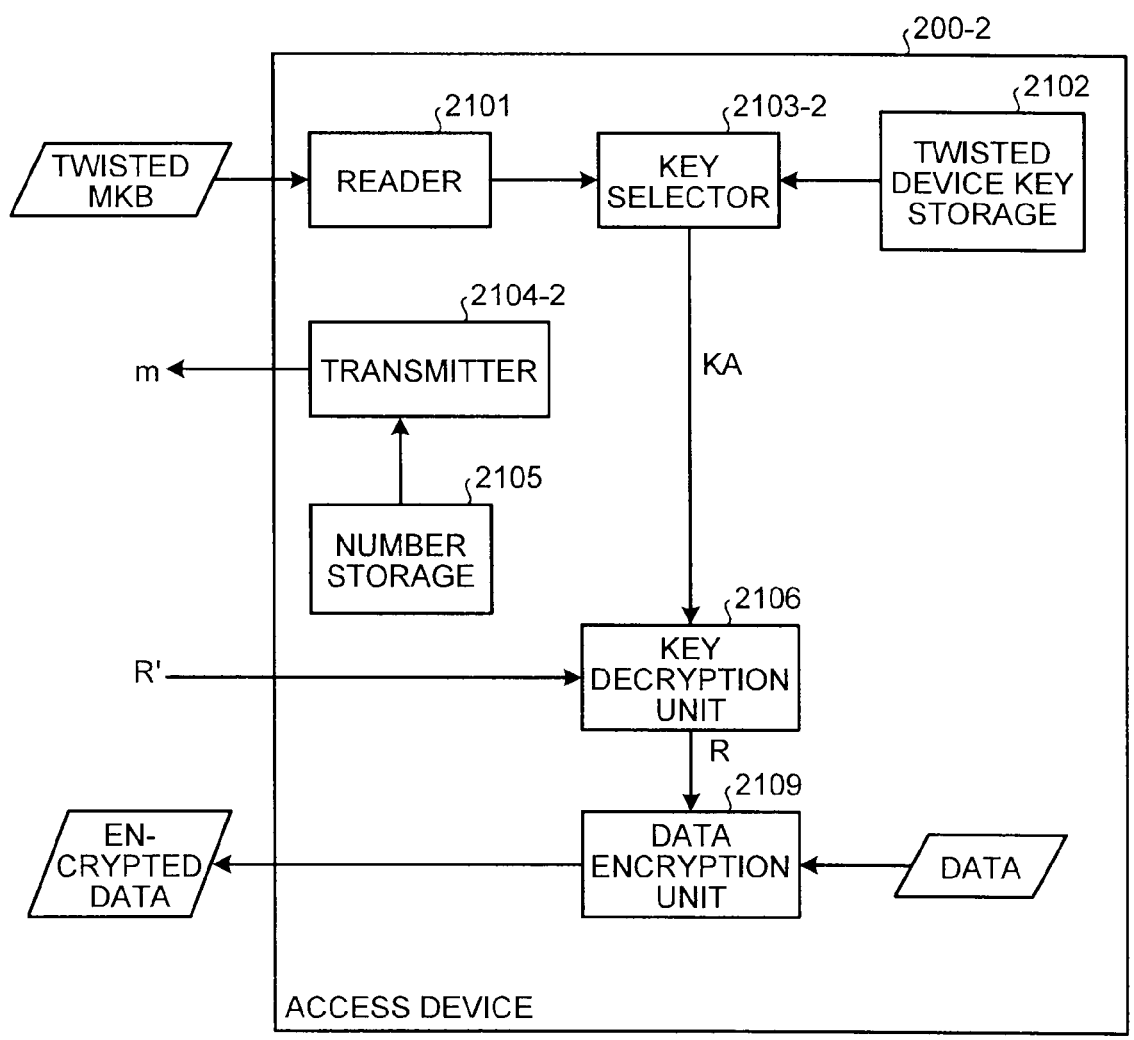
FIG. 8 is a block diagram of an access device of the second embodiment.

FIG. 8 is a block diagram illustrating an example of a configuration of an access device 200-2 of the second embodiment. As illustrated in FIG. 8, the access device 200-2 includes a reader 2101, a twisted device key storage 2102, a key selector 2103-2, a transmitter 2104-2, a number storage 2105, a key decryption unit 2106, and a data encryption unit 2109.

The second embodiment differs from the first embodiment in that the functions of the key selector 2103-2 and the transmitter 2104 and the data encryption unit 2109 are added and that the data decryption unit 2107 and the data utilization unit 2108 are eliminated. Because other configurations and functions are identical to those of the access device 200 of the first embodiment of FIG. 4, other configurations and functions are designated by the same numeral, and the descriptions will not be repeated.

The data decryption unit 2107 is eliminated for the sake of convenience, and the access device 200-2 may be configured to include the data decryption unit 2107. Similarly to the second embodiment, the access device 200 of the first embodiment may be configured to include the data encryption unit 2109.

The key selector 2103-2 selects the twisted device key corresponding to the twisted MKB from the plural twisted device keys and computes the authentication key KA from the selected twisted device key. In the second embodiment, because the twisted MKB has the data structure different from that of the first embodiment, the key selector 2103-2 selects the twisted device key through the processing corresponding to the twisted MKB of the second embodiment.

The transmitter 2104-2 differs from the transmitter 2104 in that the key index i(m) is not transmitted. The data encryption unit 2109 encrypts the data D to be written in the secret area 1110 using the random number R and computes the encrypted data D'=E(R,D).

Figure 9:
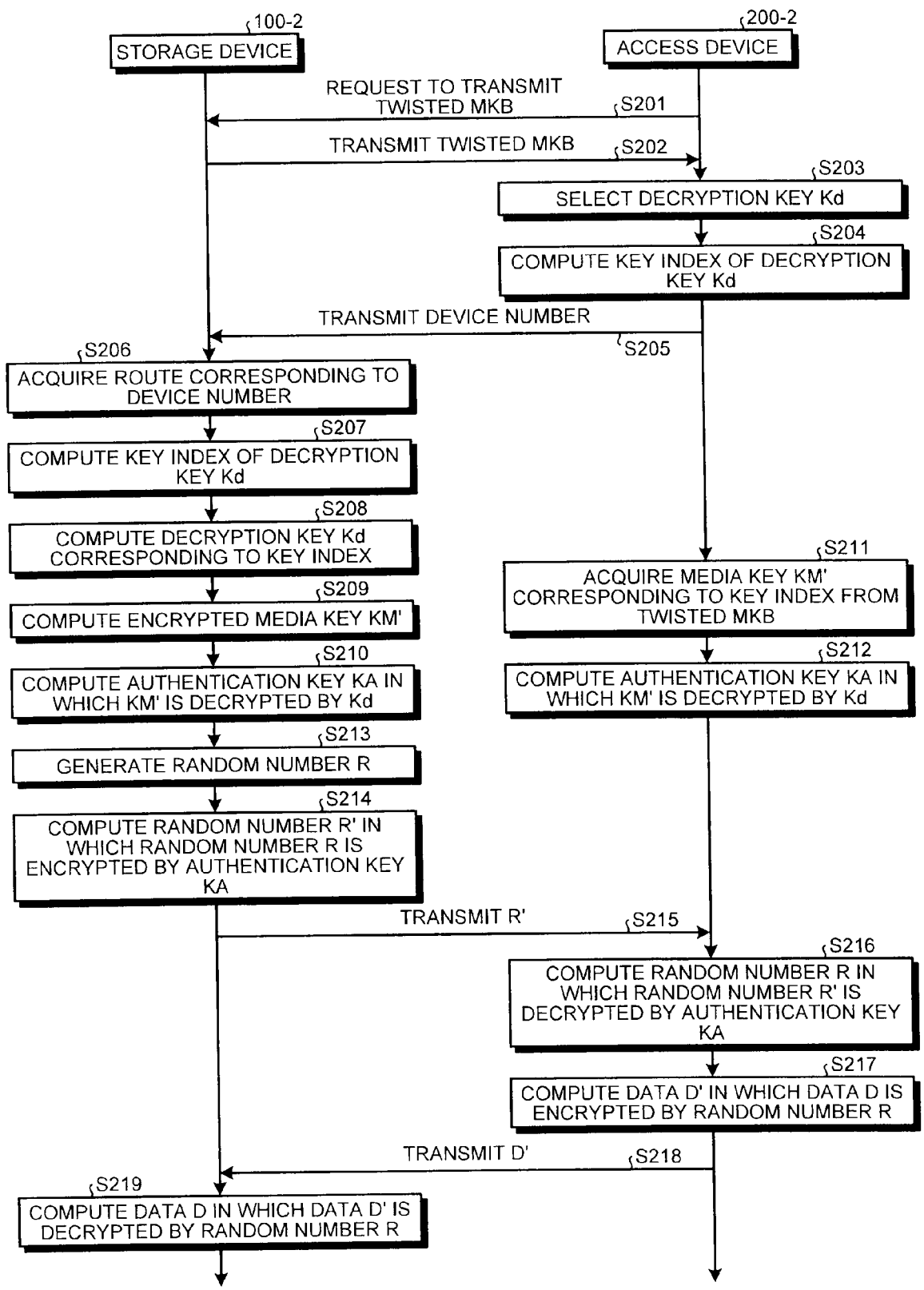
FIG. 9 is a sequence diagram of access processing of the second embodiment.

The access processing, which is performed by the storage device 100-2 and the access device 200-2 of the second embodiment, will be described below with reference to FIG. 9. FIG. 9 is a sequence diagram illustrating an entire flow of the access processing of the second embodiment.

Because Steps S201 to S204 are identical to Steps S101 to S104 of FIG. 5, the descriptions will not be repeated.

In the second embodiment, the transmitter 2104-2 transmits the device number m stored in the number storage 2105 to the storage device 100-2 (Step S205).

The acquisition unit 1102-2 of the storage device 100-2 refers to the device number table of FIG. 7 to acquire the route (index) corresponding to the received device number (Step S206). The acquisition unit 1102-2 computes the key index of the decryption key Kd from the acquired index (Step S207). This processing is described in detail later.

Because Steps S208 to S214 are identical to Steps S106 to S112 of FIG. 5, the descriptions will not be repeated.

An example of the processing in which the access device 200-2 writes the data in the secret area 1110 of the storage device 100-2 using the authentication key KA will be described below with reference to FIG. 9.

The storage device 100-2 transmits the computed encryption random number R' to the access device 200-2 (Step S215). The key decryption unit 2106 of the access device 200-2 computes the random number R, in which the received encryption random number R' is decrypted using the authentication key KA (Step S216). The data encryption unit 2109 computes the encrypted data D', in which the data D to be written in the secret area 1110 is encrypted using the random number R (Step S217). The access device 200-2 transmits the encrypted data D' to the storage device 100-2 (Step S218).

The data decryption unit 1112 of the storage device 100-2 computes the data D, in which the received encrypted data D' is decrypted using the random number R (Step S219).

Through the above-described pieces of processing, the processing of accessing the secret area can be performed by the authentication key sharing in which the MKB technology is used.

A specific example of the access processing will further be described below. It is assumed that the route x=(2,0,2,2,1) is allocated to the access device 200-2. Accordingly, the device number m=20221_3=187 is stored in the number storage 2105 of the access device 200-2. The set of key rings similar to that of the expression (9) and the set of suffixes similar to that of the expression (11) are stored in the twisted device key storage 2102.

The twisted MKB stored in the general area 1111 of the storage device 100-2 includes the MKB index and the base key. The MKB index has the same configuration as the first embodiment. The base key that is slightly different from that of the first embodiment is used in the second embodiment. It is assumed that the MKB index (notated by I_MKB) is given by the equation (20).

This is the MKB index that revokes the access device 200-2 to which the route y0=(1,0,2,1,1) and the route y2=(1,0,2,2,1) are allocated. At this point, the base key (notated by B_MKB) of the second embodiment is fixed by the following equation (26).

$$B\_MKB=\{$$

$$KM(0),$$

$$KM(2),$$

$$KM(1,1),$$

$$KM(1,2),$$

$$KM(1,0,0),$$

$$KM(1,0,1),$$

$$KM(1,0,2,0),$$

$$KM(1,0,2,1,0),$$

$$KM(1,0,2,1,2),$$

$$KM(1,0,2,2,0),$$

$$KM(1,0,2,2,2)\} \qquad (26)$$

The function KM is expressed by the following equation (27).

$$KM(n0)=E(PF(n0),KM0),$$

$$KM(n0,n1)=E(PF(n0,n1),KM1),$$

$$KM(n0,n1,n2)=E(PF(n0,n1,n2),KM2),$$

$$KM(n0,n1,n2,n3)=E(PF(n0,n1,n2,n3),KM3),$$

$$KM(n0,n1,n2,n3,n4)=E(PF(n0,n1,n2,n3,n4),KM4) \qquad (27)$$

The route function PF is identical to that of the first embodiment. The media keys {KM0,KM1,KM2,KM3,KM4} are stored in the media key storage 1104-2 of the storage device 100-2. One media key exists in the first embodiment. On the other hand, the plural media keys exist in the second embodiment.

In the second embodiment, one twisted MKB exists for one storage device 100-2. When the access device 200-2 writes the data in the secret area 1110 of the storage device 100-2, the reader 2101 reads the twisted MKB from the general area 1111 of the storage device 100-2. The reader 2101 transmits the MKB index of the read twisted MKB to the key selector 2103-2. The key selector 2103-2 reads the twisted device key from the twisted device key storage 2102 to select the decryption key Kd. The method for selecting the decryption key Kd is identical to that of the first embodiment.

In the case in which the key selector 2103-2 can find the decryption key Kd, the key selector 2103-2 reads the base key corresponding to the suffix of the decryption key Kd from the twisted MKB read by the reader 2101. For example, in the case in which (1,0,2,0) is the suffix of the decryption key Kd, the key selector 2103-2 reads the key KM (1,0,2,0) that is of the corresponding base key from the twisted MKB. The key selector 2103-2 decrypts the key KM(1,0,2,0) using the decryption key Kd to acquire the authentication key KA (KA=D(Kd,KM(1,0,2,0))).

On the other hand, in the storage device 100-2, the receiver 1103 receives the device number m transmitted from the transmitter 2104-2 of the access device 200-2. Unlike the first embodiment, in the second embodiment, the device number does not always have the mathematical relationship with the device key.

That is, the device number and (the route of) the twisted device key are correlated by the device number table of FIG. 7. In the device number table, only one twisted device key corresponds to one device number. Alternatively, the plural device numbers may be configured to correspond to one twisted device key.

The receiver 1103 transmits the received device number m to the acquisition unit 1102-2. The acquisition unit 1102-2 refers to the device number table of FIG. 7 to find the route corresponding to the device number m. For example, it is assumed that the device number m is 1000. The acquisition unit 1102-2 refers to the device number table to acquire (the route of) the corresponding twisted device key (1,0,2,0,1).

Then the acquisition unit 1102-2 finds the decryption key Kd. Therefore, the acquisition unit 1102-2 produces the associated route set I_D of the route of the acquired twisted device key. The following equation (28) indicates an example of the produced associated route set I_D.

$$I\_D=\{(1),(1,0),(1,0,2),(1,0,2,0),(1,0,2,0,1)\} \qquad (28)$$

The acquisition unit 1102-2 reads the MKB index (I_MKB) of the twisted MKB from the general area 1111 to compute the key index of the decryption key Kd produced by the access device 200-2. This processing is similar to that of the access device 200-2. That is, the acquisition unit 1102-2 computes the key index using the following function

```
key_index(I_D,I_MKB).
key_index(I_D,I_MKB){
    int i,j;
    for (j = 0; j < 5; j++)
        for (i = 0; i < 11; i++)
            if(I_D[j] == I_MKB[i])
                return j;
    return −1;
}
```

It is assumed that I_D is indicated by the equation (22) while I_MKB is indicated by the equation (20). At this point, key_index(I_D,I_MKB) returns 3. Accordingly, the acquisition unit 1102-2 selects I_D[3]=(1,0,2,0). The acquisition unit 1102-2 also reads the key KM(1,0,2,0)=E(PF(1,0,2,0), KM3) that is of the base key corresponding to the key index (1,0,2,0) of the decryption key Kd from the general area 1111. The acquisition unit 1102-2 transmits the key index (1,0,2,0) of the decryption key Kd, the key KM(1,0,2,0), and the device number m to the key generator 1105-2.

The key generator 1105-2 reads the generator matrix M from the device key storage 1101 to generate the authentication key KA corresponding to the key index i(m). For example, the key generator 1105-2 acquires the authentication key KA through the following procedure.
i) The route function value PF(1,0,2,0)=k(0,1)(+)k(1,0)(+)k(2,2)(+)k(3,0) is computed for the route fixed by the key index i(m).
ii) The decryption key Kd=G(m,PF(1,0,2,0))=G(100,PF(1,0,2,0)) is computed.
iii) The key KM(1,0,2,0) is decrypted using the decryption key Kd to acquire the authentication key KA (KA=D(Kd,KM(1,0,2,0))).

The key generator 1105-2 transmits the computed authentication key KA to the key encryption unit 1107. The key encryption unit 1107 makes the request to generate the random number to the randomizer 1106 and receives the random number R generated by the randomizer 1106. The key encryption unit 1107 encrypts the random number R using the authentication key KA and transmits the encryption random number R'=E(KA,R) that is of the encrypted random number R to the access device 200-2. On the other hand, the randomizer 1106 also transmits the random number R to the data decryption unit 1112. The data decryption unit 1112 retains the acquired random number R.

The access device 200-2 inputs the acquired encryption random number R' to the key decryption unit 2106. The key decryption unit 2106 receives the authentication key KA from the key selector 2103-2 and decrypts the encryption random number R' using the authentication key KA. As a result, the random number R of the plain text is acquired (R=D(KA,R')). The key decryption unit 2106 transmits the random number R to the data encryption unit 2109. When receiving the data D to be written in the secret area 1110, the data encryption unit 2109 encrypts the data D using the random number R to acquire the encrypted data D' (D'=E(R,D)). The data encryption unit 2109 transmits the encrypted data D' to the storage device 100-2.

The storage device 100-2 inputs the acquired encrypted data D' to the data decryption unit 1112. The data decryption unit 1112 decrypts the encrypted data D' using the random number R, which is previously acquired and retained, and acquires the plain text data D (D=D(R,D')). The data decryption unit 1112 records the data D in the secret area 1110.

Thus, in the second embodiment, the access device can compute the key index to perform the processing instead of receiving the key index from the storage device.

Third Embodiment

In the first embodiment, the method similar to that of Japanese Patent No. 3957978 is cited as an example of the MKB method. Alternatively, the MKB method disclosed in D. Naor, M. Naor, and J. Lotspiech: "Revocation and Tracing Schemes for Stateless Receivers," In Proc. of CRYPTO '01, LNCS 2139, Springer-Verlag, pp. 41-62, 2001 may be adopted. In the third embodiment, an SD (Subset Difference) method that is one of the MKB methods disclosed therein by way of example. In the third embodiment, an MKB in the SD method is used as the twisted MKB of the first embodiment.

The SD method will be described with reference to FIGS. 10 to 21.

Figure 10:
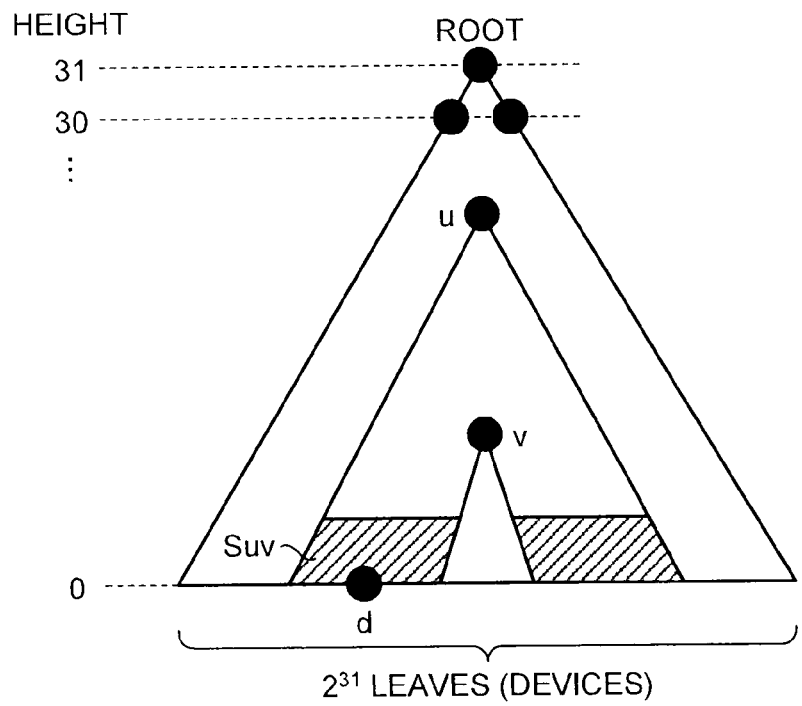
FIG. 10 is a schematic diagram of a tree structure in which a device number is allocated to a leaf.

A tree structure in which the device number is allocated to a leaf and a secret key (device key) provided to the device will be described below. At this point, either a common-key encryption method or a public-key encryption method may be used to perform the encryption. For the sake of convenience, the common-key encryption method is used to perform the encryption. In this case, the encryption key and the decryption key, which correspond to a certain u node and a certain v node, are identical to each other. In the SD method, each device has a unique device number, and each device number corresponds to one arbitrary leaf on the tree structure as illustrated in FIG. 10. FIG. 10 is a view schematically illustrating the tree structure in which the device number is allocated to the leaf.

In FIG. 10, each device number is allocated to the leaf of the tree structure. A topmost node in the tree structure is called a root. Assuming that "0" is a height of the leaf node of the tree structure while "31" is a height of the root node, the number of leaves, namely, the number of devices becomes $2^{31}$ in total.

One device key is allocated to each two nodes in the tree structure. Hereinafter, when the two nodes are notated by the u node and the v node, it is assumed that the u node is located higher than the v node unless otherwise noted. kuv is a notation of the device key allocated to the u node and the v node, which are of the two nodes. Suv is a notation of the set of leaves that have not the v node but the u node as an ancestor. In the case in which the leaf allocated to the device number d belongs to Suv, kuv is given as the device key (or kuv can be derived as described later). The device derives the decryption key using the device key in order to decrypt the ciphertext.

Figure 11:
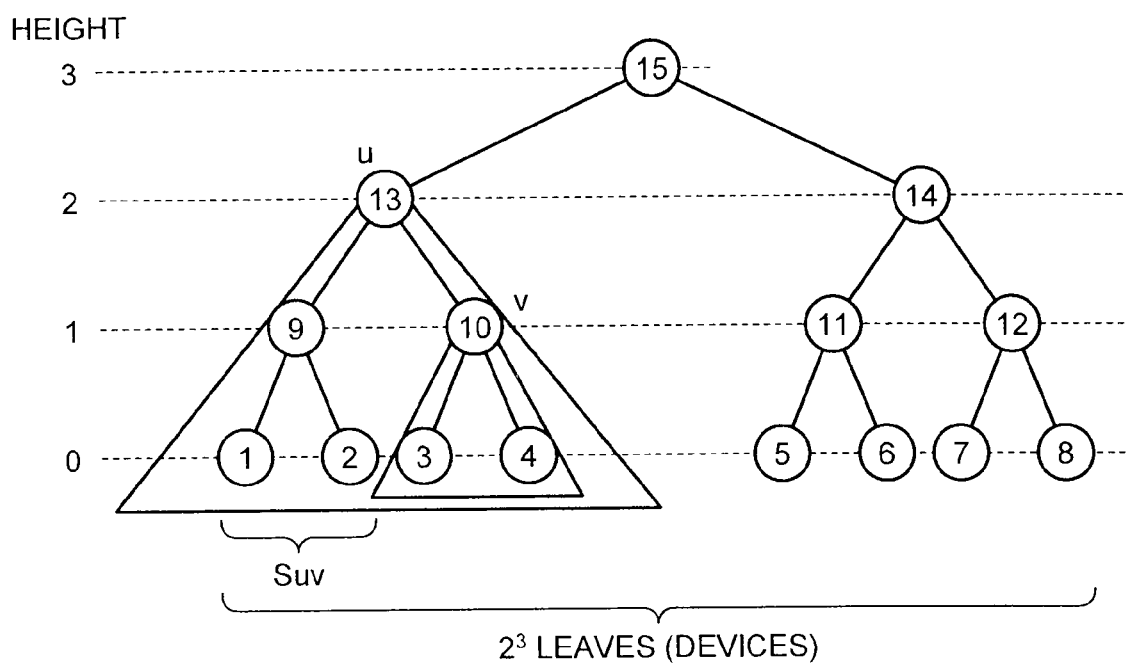
FIG. 11 is a view specifically illustrating the tree structure of FIG. 10.

FIG. 11 is a view specifically illustrating the tree structure of FIG. 10. In FIG. 11, the tree structure is illustrated in the case in which the root node "15" has the height of "3". In this case, the number of leaves, namely, the number of devices becomes $2^3=8$ in total. It is assumed that the u node is the node "13" of FIG. 11 while the v node is the node "10" of FIG. 11. At this point, Suv=S(13,10), which is of the set of leaves that have not the v node but the u node as the ancestor, becomes {node "1", node "2"}={1,2}. Accordingly, kuv=k(13,10) is allocated to the leaf (device) belonging to S(13,10).

The device keys provided to all the devices are generated when the device keys kuv are generated for all the possible combinations of the u node and the v node. At this point, in the case in which the device keys are independently generated for all the possible combinations of the u node and the v node, the number of device keys retained by each device is significantly increased. Therefore, the device key is provided in manner of FIG. 12.

Figure 12:
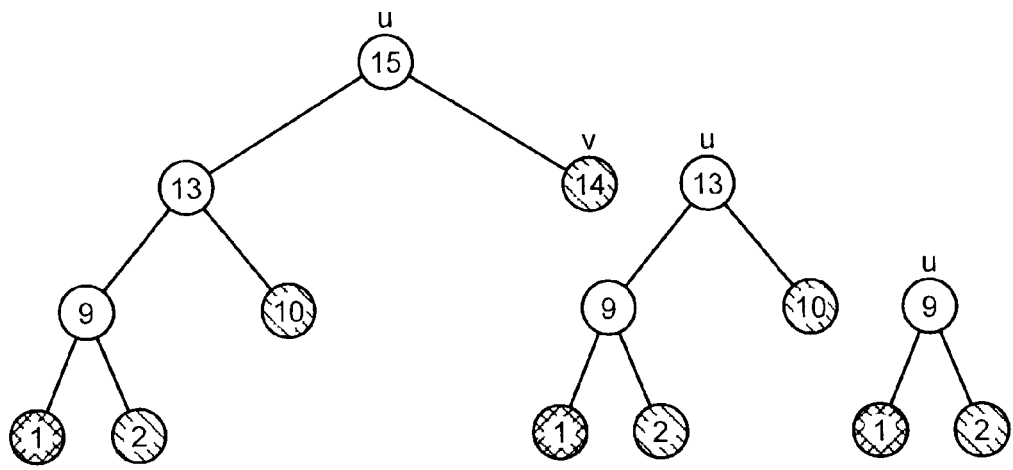
FIG. 12 is a view specifically illustrating an example of the tree structure similar to that of FIG. 11, in which a node "15" is set to a root.

FIG. 12 is a view specifically illustrating an example of the tree structure similar to that of FIG. 11, in which the node "15" is set to the root. In the case in which all the device keys are independently generated, the device keys provided to the device corresponding to the leaf "1" become k(15,14), k(15,11), k(15,12), k(15,5), k(15,6), k(15,7), k(15,8), k(15,10), k(15,3), k(15,4), k(15,2), k(13,10), k(13,3), k(13,4), k(13,2), and k(9,2). The number of device keys is reduced by introducing the one-way function G defined by the following expression (29).

$$G: \{0,1\}^x \rightarrow \{0,1\}^{3x} \quad (29)$$

For example, the device keys k(15,11) and k(15,12) can be derived using the device key k(15,14) as indicated by the following equation (30).

$$G\{k(15,14)\}=k(15,11)\|Kd(15,14)\|k(15,12) \quad (30)$$

Where ∥ expresses coupling of the pieces of data, and Kd(15,14) is the decryption key used to decrypt the ciphertext to which the index information indicating that the u node expresses "15" while the v node expresses "14" is added. As to the method for configuring the function G, there is a method for configuring the function G using a hash function H having an output length x as indicated by the following equation (31).

$$G(k(15,14))=H(k(15,14)\|s0)$$
$$\|H(k(15,14)\|s1)$$
$$\|H(k(15,14)\|s2)=k(15,11)\|Kd(15,14)\|k(15,12) \quad (31)$$

Where s0, s1, and s2 are constants. In the example of FIGS. 11 and 12, s0 is a value that is used to obtain the device key k(15,11) of the left child node "11", in which the u node is "15" while the v node is "14", from the device key k(15,14). s1 is a value that is used to obtain the decryption key Kd(15,14). The decryption key Kd(15,14) is used to decrypt the ciphertext, to which the index information indicating that the u node is the node "15" while the v node is the node "14" is added, from the device key k(15,14). s2 is a value that is used to obtain the device key k(15,12) of the right child node "12", in which the u node is "15" while the v node is "14", from the device key k(15,14). An AES-G3 function disclosed in "3.2.2 Calculation of Subsidiary Device Keys and Processing Keys", Advanced Content System (AACS), Introduction and Common Cryptographic Elements Book, Revision 0.951 Final, pp. 13, Sep. 28, 2009 may be used as the function G.

In the case in which the one-way function G is introduced, when six device keys k(15,14), k(15,10), k(15,2), k(13,10), k(13,2), and k(9,2) are provided to the device corresponding to the leaf "1", other device keys can be derived using the one-way function G. For example, the device keys k(15,11) and k(15,12) are acquired by applying the one-way function G to the device key k(15,14). The device keys k(15,5) and k(15,6) are acquired by applying the one-way function G to the device key k(15,11). The device keys k(15,7) and k(15,8) are acquired by applying the one-way function G to the device key k(15,12). Similarly the device keys k(13,3) and k(13,4) are acquired from the device key k(13,10). A device key (root key) common to all the device may be provided in addition to the device keys.

Figure 13:
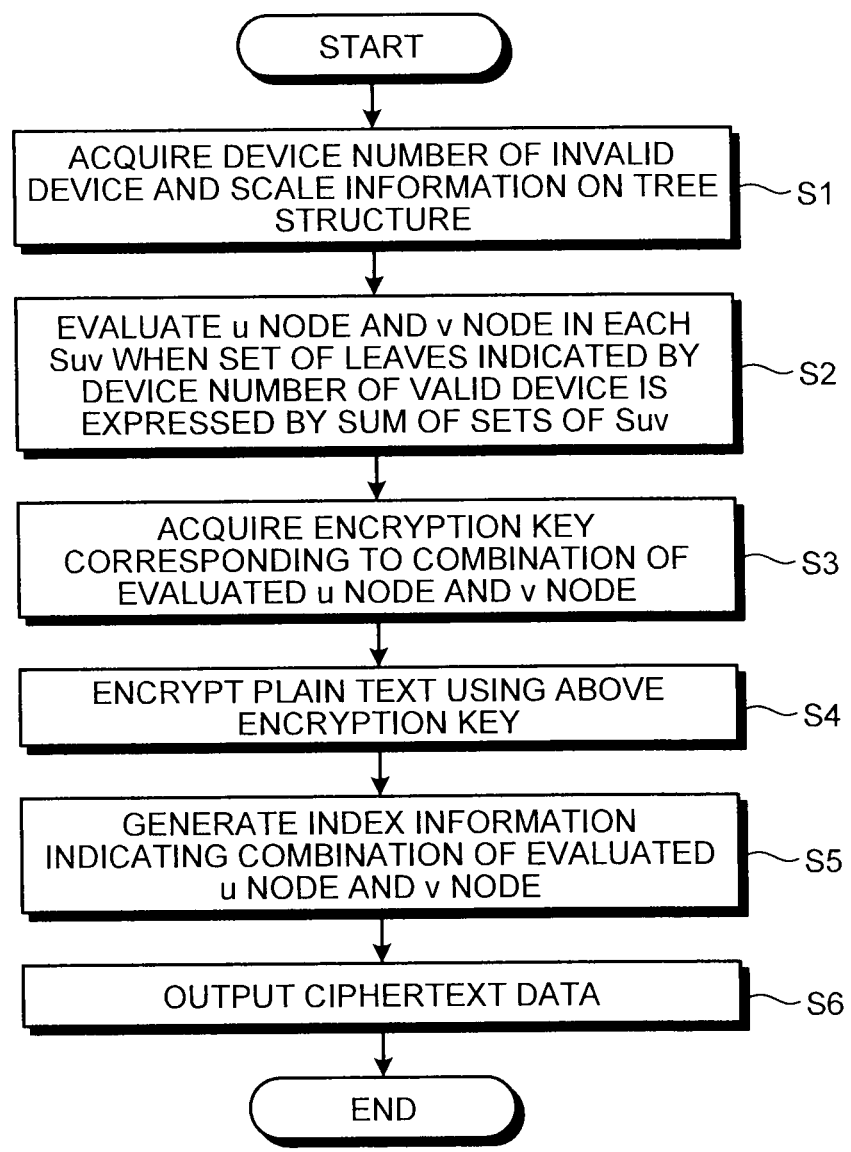
FIG. 13 is a flowchart illustrating an encryption processing operation.

FIG. 13 is a flowchart illustrating an encryption processing operation. The device (hereinafter referred to as an encryption device) that performs the encryption receives the device number of the revoked device (for example, from the reliable third party) and information on a scale of the tree structure (Step S1). The encryption device obtains the combination of the u node and the v node in each Suv using the technique disclosed in D. Naor, M. Naor, and J. Lotspiech: "Revocation and Tracing Schemes for Stateless Receivers," In Proc. of CRYPTO '01, LNCS 2139, Springer-Verlag, pp. 41-62, 2001, when the set of leaves indicated by the device numbers of the valid device that can decrypt the ciphertext is expressed as the sum of sets of Suv (Step S2).

Figure 14:
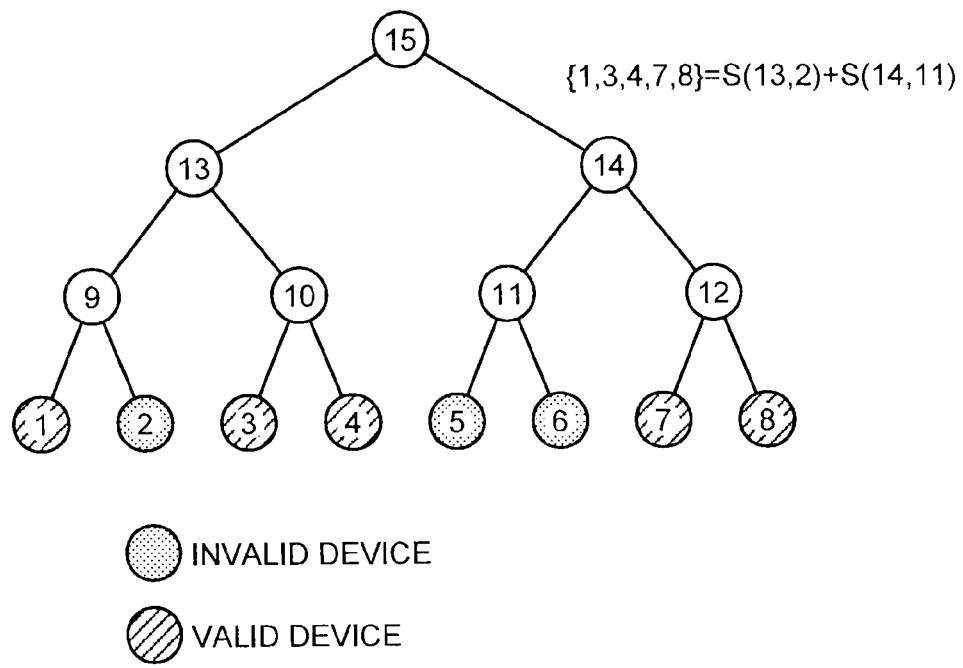
FIG. 14 is a view illustrating a method for selecting a set of leaves in an SD system.

For example, as illustrated in FIG. 14, it is assumed that the leaves "1" to "8" correspond to the devices "1" to "8" while the devices "2", "5", and "6" are the revoked devices. The set {1,3,4,7,8} of the leaves corresponding to the valid devices "1", "3", "4", "7", and "8" except the revoked devices can be expressed by the sum of sets of the set S(13,2)={1,3,4} of leaves that have not the node "2" but the node "13" as the ancestor and the set S(14,11)={7,8} of leaves that have not the node "11" but the node "14" as the ancestor, namely, {1,3,4, 7,8}=S(13,2)+S(14,11).

At this point, the device key k(13,2) corresponding to the combination of the u node and the v node of S(13,2) is provided to the valid devices "1", "3", and "4" (or can be derived) while the device key k(13,2) is not provided to the revoked device "2" (and cannot be derived). Originally the device key k(13,2) is not provided to the leaves "5" to "8" (and cannot be derived). The device key k(14,11) corresponding to the combination of the u node and the v node of S(14,11) is provided to the leaves "7" and "8" while the device key k(14,11) is not provided to the leaves "5" and "6" (and cannot be derived). Originally the device key k(14,11) is not provided to the leaves "1" to "4" (and cannot be derived).

Accordingly, referring to FIG. 14, the encryption key (in the case in which the common-key encryption method is used to perform the encryption, the corresponding encryption key is also Kd(13,2)) corresponding to the decryption key Kd(13, 2), which can be derived from the device key k(13,2) that is not provided to the leaf "2" of the revoked device, and the encryption key (in the case in which the common-key encryption method is used to perform the encryption, the corresponding encryption key is also Kd(14,11)) corresponding to the decryption key Kd(14,11), which can be derived from the device key k(14,11) that is not provided to the leaves "5" and "6" of the revoked devices, are acquired (Step S3). The method for deriving the decryption key (encryption key) from the device key is described later. The input plain text (corresponding to KM in the first embodiment) is encrypted using the acquired encryption key (Step S4).

In the case of the tree structure of FIG. 14, when the two ciphertexts are generated by encrypting the plain text using the encryption key Kd(13,2) and the encryption key Kd(14, 11), only the valid devices "1", "3", "4", "7", and "8" in the devices "1" to "8" that receive the ciphertexts can decrypt the ciphertexts.

The encryption device generates index information indicating the combination of the u node and the v node corresponding to each decryption key used to decrypt the generated ciphertext (Step S5). The index information indicating the combination of the u node and the v node corresponding to each decryption key used to decrypt the ciphertext is added to the ciphertext, and the data acquired as a result of the addition of the index information is output as the ciphertext data (Step S6). In the third embodiment, unless otherwise noted, the ciphertext means one in which the plain text is encrypted, and the ciphertext data includes the ciphertext and the index information corresponding to the ciphertext.

Figure 15:
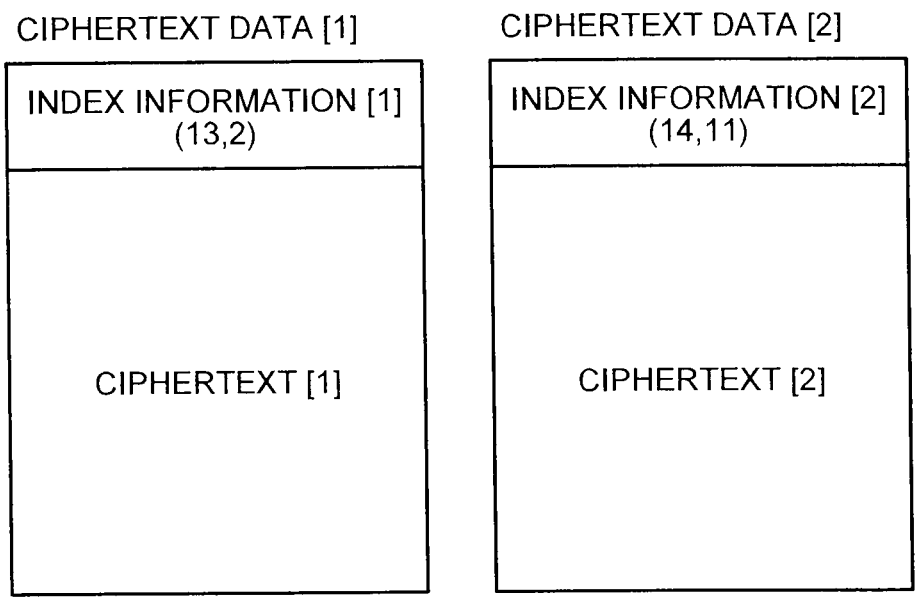
FIG. 15 is a view illustrating an example of a data structure of a ciphertext data.

FIG. 15 is a view illustrating an example of the data structure of the ciphertext data. As illustrated in FIG. 15, the ciphertext data includes the ciphertext that is generated using the encryption key acquired in Step S3 and the index information indicating the combination of the u node and the v node corresponding to the decryption key used to decrypt the ciphertext. For example, the index information "13,2" is added to a ciphertext [1] generated using the encryption key Kd(13,2). The index information "14,11" is added to a ciphertext [2] generated using the encryption key Kd(14,11).

Figure 16:
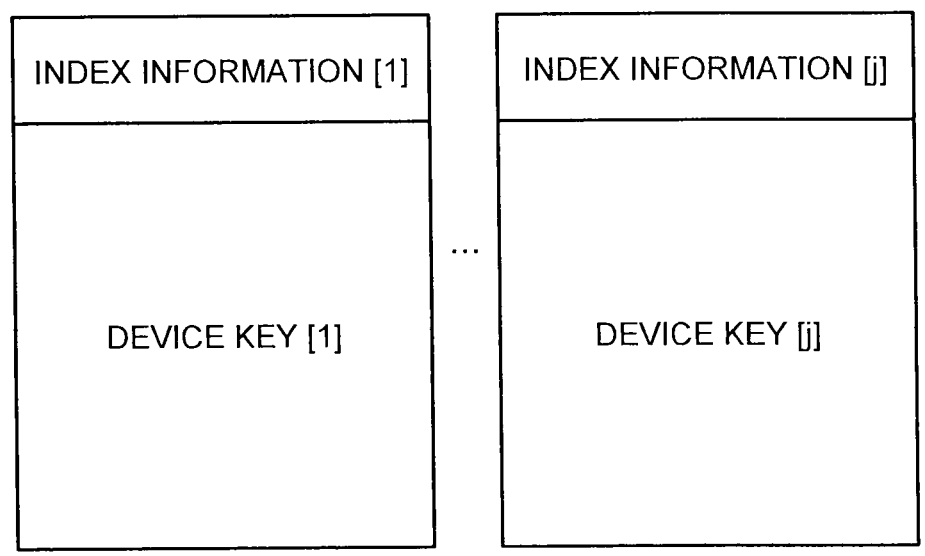
FIG. 16 is a view illustrating an example of a data structure of a device key.

As illustrated in FIG. 16, the device (hereinafter referred to as a decryption device) that performs the decryption retains the device key provided to the decryption device and the index information (key index information) indicating the combination of the u node and the v node corresponding to the device key. The decryption device retains the device number of the device.

Figure 17:
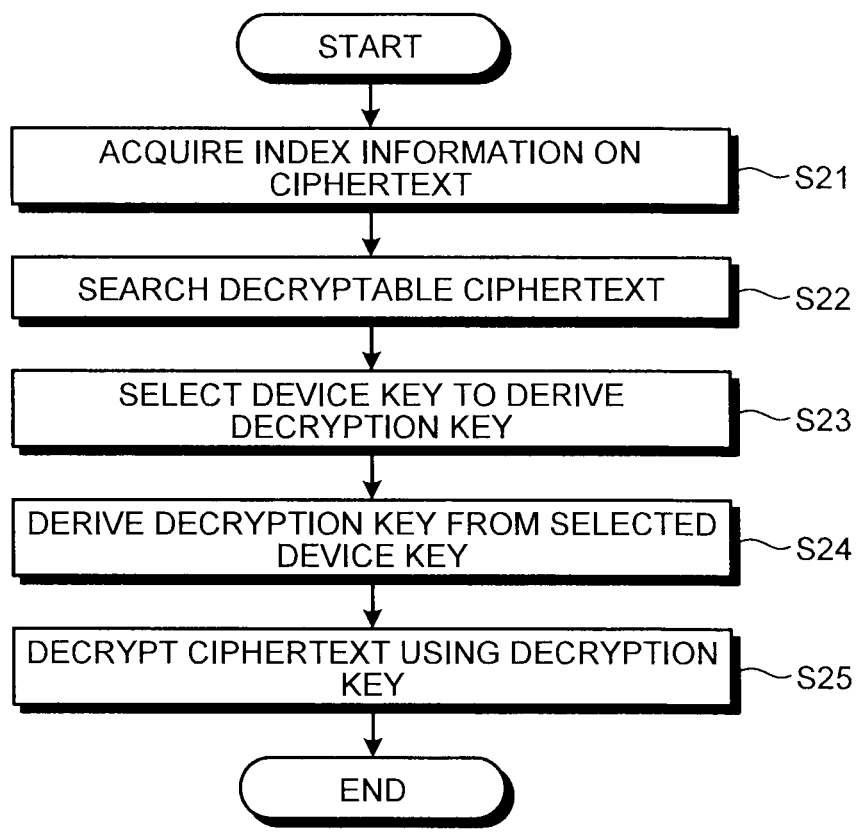
FIG. 17 is a flowchart illustrating an outline of processing of decrypting the ciphertext.

FIG. 17 is a flowchart illustrating an outline of processing of decrypting the ciphertext (corresponding to the data in which KM is encrypted using the device key in the first embodiment). The decryption device acquires the index information on the ciphertext from the ciphertext data (Step S21). Whether the decryption device can decrypt the ciphertext corresponding to the acquired index information on the ciphertext is determined to search the ciphertext that can be decrypted by the decryption device (Step S22). The decryption device selects the device key, which can derive the decryption key used to decrypt the ciphertext determined to be decryptable, from the device keys retained thereby (Step S23). The decryption device derives the decryption key, which is used to decrypt the ciphertext determined to be decryptable, using the selected device key (Step S24), and the decryption device decrypts the ciphertext determined to be decryptable using the derived decryption key (Step S25).

FIG. 18 is a flowchart illustrating the ciphertext determination processing in Step S22 of FIG. 17. The decryption device acquires the device number d of the decryption device (Step S31), and the decryption device sets a variable i to "1" (Step S32). The decryption device acquires the index information [i] on the ciphertext included in the ith ciphertext data from the acquired ciphertext data (Step S33), and the decryption device extracts the u node and the v node, which are indicated by the index information [i]. The decryption device determines whether the leaf indicated by the device number d has not the v node but the u node as the ancestor in the predetermined tree structure (Step S34). When the leaf indicated by the device number d of the decryption device has not the v node but the u node as the ancestor in the predetermined tree structure (Yes in Step S34), the decryption device determines that the ciphertext [i] corresponding to the index information [i] can be decrypted (Step S35), and the ciphertext determination processing is ended. When the leaf indicated by the device number d is not one that has not the v node but the u node as the ancestor in the predetermined tree structure (No in Step S34), the flow goes to Step S36.

The decryption device determines whether checks in Steps S33 and S34 are made to all the pieces of index information on the ciphertexts in the acquired pieces of ciphertext data (Step S36). When the unchecked index information on the ciphertext exists (No in Step S36), the decryption device increments i by "1" (Step S37), and the flow returns to Step S33. When the checks are made to all the pieces of index information on the ciphertexts (Yes in Step S36), the decryption device determines that the decryption device is the revoked device (Step S38), the decryption device makes a notification if needed, and the ciphertext determination processing is ended.

The specific processing in Step S34 will be described below. The node in the tree structure is coded as follows. As illustrated in FIG. 19A, in the tree structure, "0" is allocated to the route from a certain parent node to the left child node while "1" is allocated to the route to the right child node, the route from the root to the target node (including the leaf) is expressed by "0" and "1", and finally one "1" and the as-needed number of the numerical values of "0" are added. That is, "10 . . . 0" is added. A bit length L of the code indicating each node (including the leaf) is previously fixed according to the height of the tree structure applied to the system.

For example, the bit length L of the code indicating each node (including the leaf) has a defined value of 4 bits when the tree structure has the height of 3 as illustrated in FIG. 19B, and the bit length L has 32 bits when the tree structure has the height of 31 as illustrated in FIG. 10.

After the route from the root to the target node (including the leaf) is expressed by "0" and "1", "1" is finally added, and a padding bit "0" is added in order to justify the bit length L to the defined value (in the case in which the number of bits is lower than the defined value L), thereby obtaining the code of the target node (including the leaf).

For example, in the tree structure in which the root is "15" as illustrated in FIG. 19B, because the code of the node has the bit length of 4 bits, as illustrated in FIG. 19C, the leaf "1" can be expressed by the code "0001", the leaf "3" can be expressed by the code "0101", and the root "15" can be expressed by the code "1000". When viewed from the least significant bit of each code, it is said that a redundant bit is continued in order to justify the bit length to the defined value L until "1" emerges initially. For example, "1" of the final 1 bit is the redundant bit in the code of the leaf "3" or the leaf "1", and "1000" is the redundant bit in the code of the root "15". In the third embodiment, the least significant bit means the rightmost bit of the code, and the most significant bit means the leftmost bit of the code.

"0001" is stored as the device number d in the device corresponding to the leaf "1" on the tree structure of FIG. 19B. The u node and the v node, which are included in the index information on the ciphertext, are expressed by the above-described codes.

As illustrated in FIG. 20, it is assumed that U and V are codes of the u node (for example, the node "15" of FIG. 19B) included in the index information [i] on the ciphertext acquired in Step S33 of FIG. 18 and the v node (for example, the leaf "3" of FIG. 19B), respectively. That is, U="1000" and V="0101".

It is assumed that Mv is a bit length (padding length) of the redundant bit of V while Mu is a bit length (padding length) of the redundant bit of U. In this case, Mv=1 and Mu=4.

The fact that the leaf indicated by the device number d of the device has the u node as the ancestor in the device number means that the following expression (32) holds.

$$(d(+)U)>>Mu==0 \tag{32}$$

Where (+) expresses an exclusive OR, >> expresses a right shift, and == expresses equivalence. For example, after the exclusive OR of d and U of the lengths L is computed as illustrated in FIG. 20, each bit is shifted rightward by Mu bit (in this case, 4 bits), and the vacant portion is padded with "0", thereby obtaining "0000". "0" is obtained by quantifying "0000" (from the binary number notation to the decimal number notation) Therefore, it is said that the leaf indicated by the device number d has the u node as the ancestor.

The fact that the leaf does not have the v node as the ancestor means that the following expression (33) holds.

$$(d(+)V)>>Mv!=0 \tag{33}$$

Where !=expresses non-equivalence. For example, after the exclusive OR of d and V of the lengths L is computed as illustrated in FIG. 20, each bit is shifted rightward by Mv bit (in this case, 1 bit), and the vacant portion is padded with "0", thereby obtaining "0010". The result of quantifying "0010" is not "0". Therefore, it is said that the leaf indicated by the device number d does not have the v node as the ancestor.

In Step S34 of FIG. 18, the expressions (32) and (33) are applied to the codes expressing the u node and the v node, which are included in the index information [i] on the ciphertext, to determine whether the ciphertext [i] can be decrypted by the device having the device number d.

The device key selection processing in Step S23 of FIG. 17 will be described below. The decryption device performs the following determination using the index information on the device key and the index information on the ciphertext, which are retained by the decryption device. It is assumed that Mu is a bit length (padding length) of the redundant bit of coded data (U) indicating the u node included in the index information [i] on the ciphertext. It is assumed that Mv is a bit length (padding length) of the redundant bit of coded data (V) indicating the v node included in the index information [i] on the ciphertext. It is assumed that Mu' is a bit length (padding length) of the redundant bit of coded data (U') indicating the u node included in the index information [j] on the device key retained by the decryption device. It is assumed that Mv' is a bit length (padding length) of the redundant bit of coded data (V') indicating the v node included in the index information [j] on the device key stored in the decryption device. In Step S34, the decryption device applies to the following expressions (34) and (35) to determine whether the ciphertext [i] can be decrypted by the device having the device number d.

$$Mu==Mu' \tag{34}$$

$$(V\&Mv')==(V'\&Mv') \tag{35}$$

Where & expresses an AND in each bit. As illustrated in FIG. 12, the fact that the leaf indicated by the device number of the device have not the v node but the u node as the ancestor holds for all the sets of the u node and the v node corresponding to the device key that is provided to the device having the device number d. Accordingly, when the expressions (34) and (35) hold, the u node corresponding to the ciphertext [i] is identical to the u node corresponding to the device key [j], and the v node corresponding to the ciphertext [i] is the ancestor of the v node corresponding to the device key [j] (or identical to the v node corresponding to the device key [j]). Therefore, the fact that the leaf indicated by the device number d of the device has not the v node but the u node as the ancestor holds for the u node and the v node corresponding to the ciphertext [i]. As described below, the decryption key can be derived using the device key [j].

In the tree structure of FIG. 19B, the case in which the device number d is "0001" corresponding to the leaf "1", V is "0101" corresponding to the leaf "3", and U is "1000" corresponding to the root node "15" will be described below by way of example. As described above, the six device keys k(15,14), k(15,10), k(15,2), k(13,10), k(13,2), and k(9,2) are provided to the device corresponding to the leaf "1". Therefore, the device key k(15,10) satisfying the expressions (34) and (35) is selected in Step S23 of FIG. 17.

The decryption key deriving processing in Step S24 of FIG. 17 will be described below. For the ciphertext selected in Step S22 and the device key (set to K) selected in Step S23, it is learned that the u node corresponding to the ciphertext is identical to the u node corresponding to the device key K, and it is learned that the v node corresponding to the ciphertext is the ancestor of the v node corresponding to the device key K (or identical to the v node corresponding to the device key K). The route through which the v node corresponding to the device key K reaches the v node corresponding to the ciphertext is considered. As illustrated in FIG. 19A, the case in which the route passes through the left child node is expressed by "0", the case in which the route passes through the right child node is expressed by "1", and the route through which the v node corresponding to the device key K reaches the v node corresponding to the ciphertext is coded. For example, the route from the node "14" to the node "6" is coded as "01". In the case in which the route through which the v node corresponding to the device key K reaches the v node corresponding to the ciphertext is coded as "b1 b2 . . . bn", the device derives the decryption key from the device key K by the following method.

Figure 21:
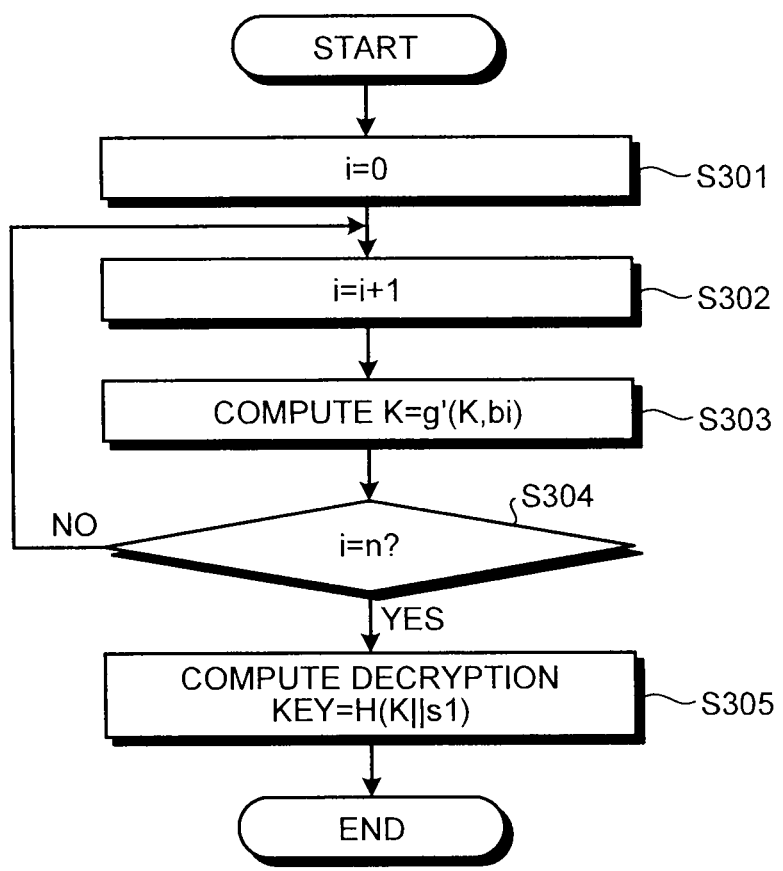
FIG. 21 is a flowchart of processing of deriving a decryption key from the device key.

FIG. 21 is a flowchart illustrating an example of the processing of deriving the decryption key from the device key K. First, i is initialized (i=0) (Step S301). Then, the following equation (36) is computed while i is incremented by 1 (i=i+1) (Step S302), and the processing of setting the computing result to K is repeated (Step S303).

$$g'(K, bi) = H(K \| s0) \text{ (in the case of } bi = 0) \quad (36)$$
$$= H(K \| s2) \text{ (in the case of } bi = 1)$$

Whether i is matched with n is determined (Step S304). When i is not matched with n (No in Step S304), K is repeatedly computed n times using the equation (36) until i is matched with n. That is, the function g' is computed for b1 b2 . . . bn. When i is matched with n (Yes in Step S304), $H(K\|s1)$ is computed and the computing result is set in the decryption key (Step S305).

As described above, various functions including the AES-G3 function can be used as the function used to derive the decryption key.

The case in which the device number d is "0001" corresponding to the leaf "1", V is "0101" corresponding to the leaf "3", and U is "1000" corresponding to the root node "15" will be described below by way of example. As described above, the device key k(15,10) is selected in Step S23 of FIG. 17. The route from the node "10" to the node "3" is coded as "0". Accordingly, the device computes g'(k(15,10),0) (the computing result is set to K) and derives the decryption key $H(K\|s1)$ using K.

In the case in which the common-key encryption method is used to perform the encryption, the encryption key can be derived from the device key by the same method as the above-described method.

Finally the device decrypts the ciphertext selected in Step S22 using the decryption key derived in Step S24 (Step S25).

Figure 22:
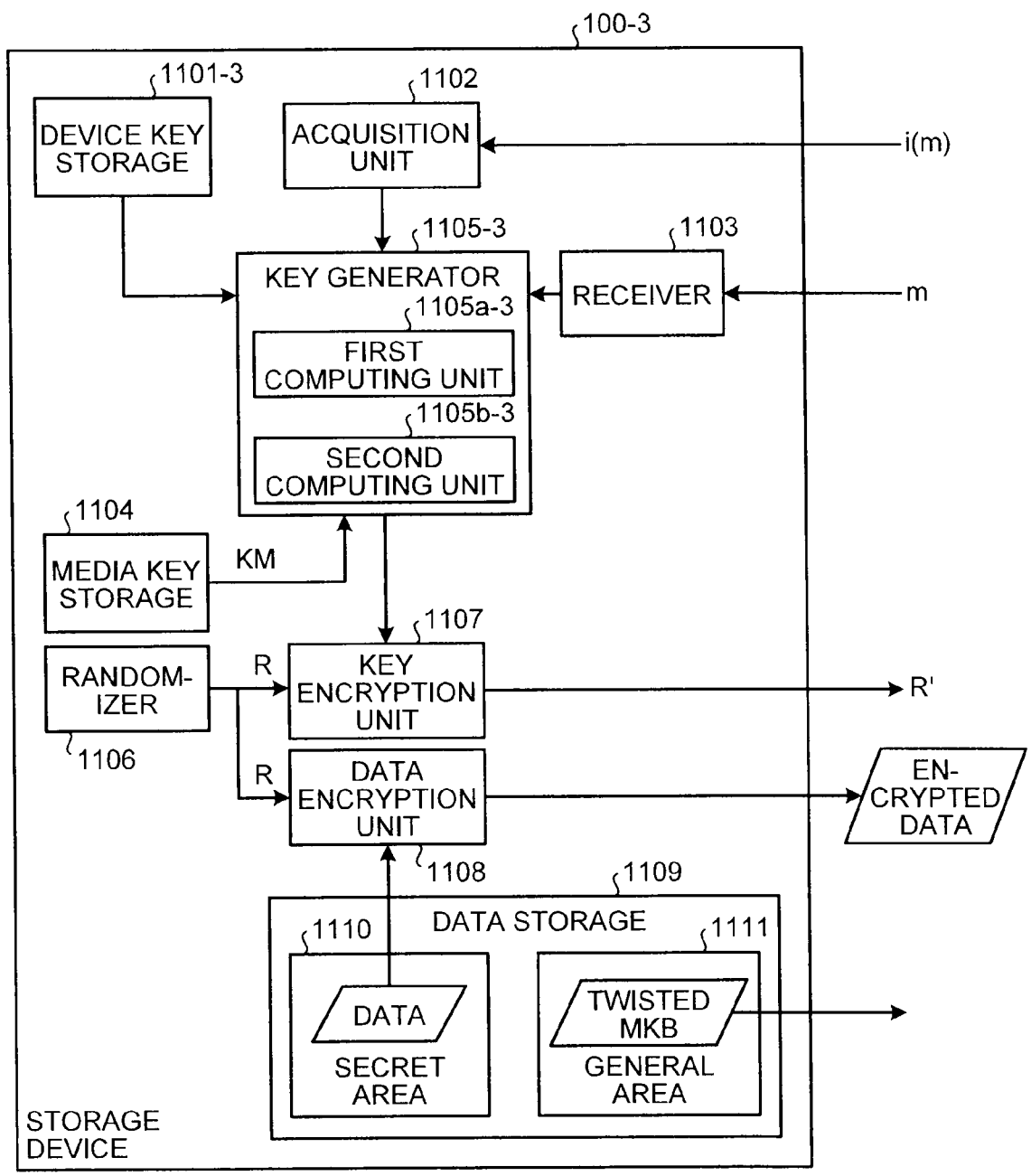
FIG. 22 is a block diagram of a storage device according to a third embodiment.

The third embodiment in which the SD method is used as the MKB method instead of the MKB method of the first embodiment will be described below. FIG. 22 is a block diagram illustrating an example of a configuration of a storage device 100-3 of the third embodiment. As illustrated in FIG. 22, the storage device 100-3 includes a device key storage 1101-3, the acquisition unit 1102, the receiver 1103, the media key storage 1104, a key generator 1105-3, the randomizer 1106, the key encryption unit 1107, the data encryption unit 1108, and the data storage 1109.

The third embodiment differs from the first embodiment in the functions of the device key storage 1101-3 and the key generator 1105-3. Because other configurations and functions are identical to those of the storage device 100 of the first embodiment of FIG. 3, other configurations and functions are designated by the same numeral, and the descriptions will not be repeated.

The device key corresponding to the combination of the nodes included in the tree structure of the SD method of FIG. 12 is stored in the device key storage 1101-3. The device key storage 1101-3 also retains the device keys of all the devices (access device 200-3). Alternatively, the device key storage 1101-3 may be configured to compute the desired device key if needed while only the information that can compute the device keys of all the devices instead of retaining the device keys of all the devices.

The key generator 1105-3 generates authentication key KA shared with the access device 200-3 from the device key that is stored in the device key storage 1101-3 and used in the SD method, a key index i(m) of the decryption key (hereinafter referred to as a decryption key index), the media key index, and the device number m. The media key index indicates the index of the media key KM' in which the media key KM is encrypted.

The key generator 1105-3 includes a first computing unit 1105a-3 and a second computing unit 1105b-3.

The first computing unit 1105a-3 computes the decryption key Kd by the procedure similar to that of FIG. 17 using the media key index (corresponding to the index information on the ciphertext in FIG. 17), the decryption key index (corresponding to the index information on the device key in FIG. 17), and the device key. In the third embodiment, the first computing unit 1105a-3 computes the decryption key Kd using the device key that is twisted by the device number m.

The second computing unit 1105b-3 computes the authentication key KA by decrypting the media key using the decryption key Kd. In the third embodiment, the second computing unit 1105b-3 computes the authentication key KA by decrypting the media key KM', in which the media key KM is encrypted using the encryption key, using the decryption key Kd. The second computing unit 1105b-3 computes the encryption key to encrypt the media key KM using a device key ki, the index information on the device key ki (decryption key index), and the index information on the media key KM' (media key index). The computing method is similar to the decryption key deriving method in Step S24 of FIG. 17.

Figure 23:
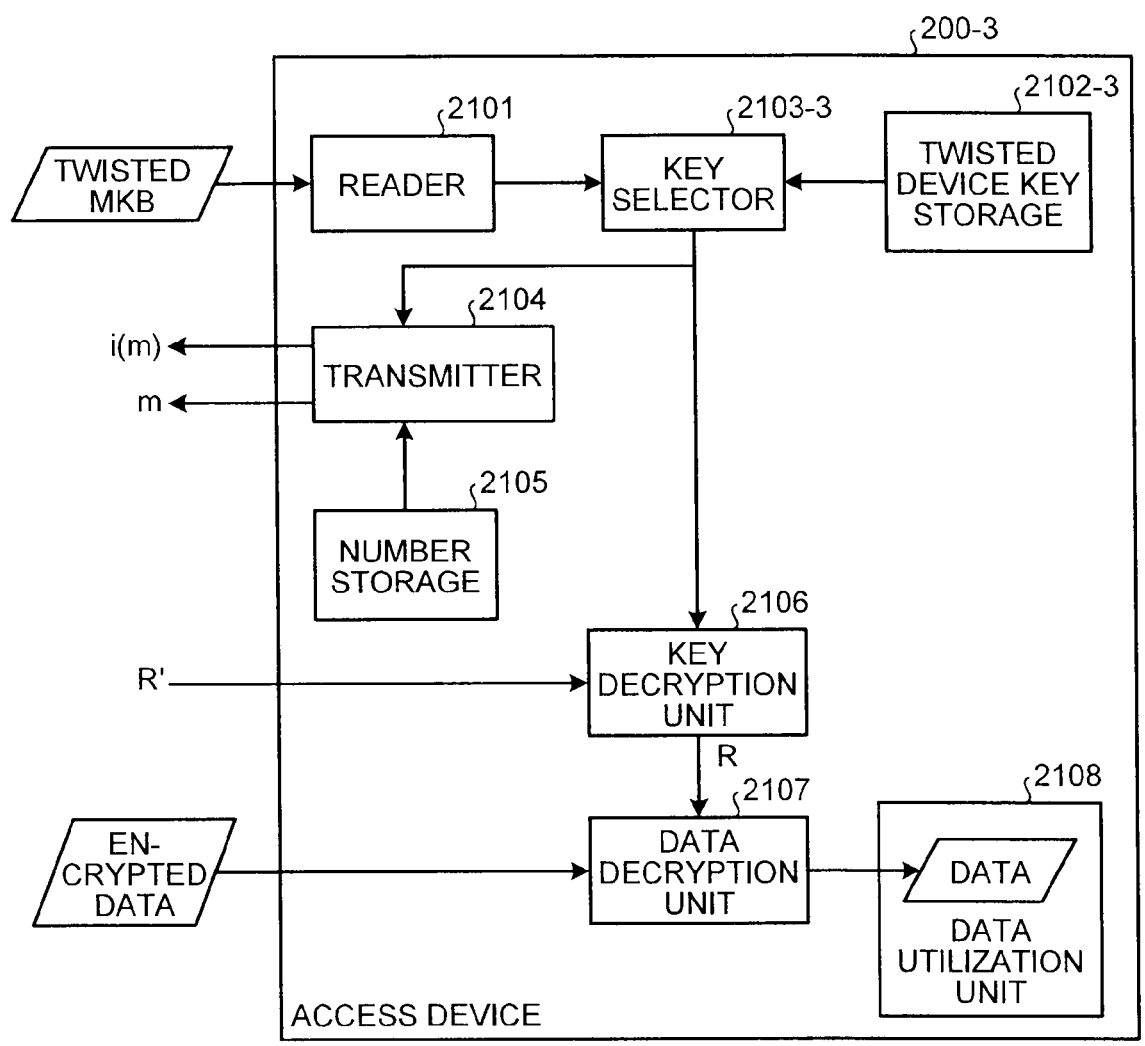
FIG. 23 is a block diagram of an access device of the third embodiment.

FIG. 23 is a block diagram illustrating an example of a configuration of an access device 200-3 of the third embodiment. As illustrated in FIG. 23, the access device 200-3 includes the reader 2101, a twisted device key storage 2102-3, a key selector 2103-3, the transmitter 2104, the number storage 2105, the key decryption unit 2106, the data decryption unit 2107, and the data utilization unit 2108.

The third embodiment differs from the first embodiment in the functions of the twisted device key storage 2102-3 and the key selector 2103-3. Because other configurations and functions are identical to those of the access device 200 of the first embodiment of FIG. 4, other configurations and functions are designated by the same numeral, and the descriptions will not be repeated.

The twisted device key, in which the device key allocated to the access device 200-3 having the device number m in the SD method of the related art is twisted, is stored in the twisted device key storage 2102-3. It is assumed that k1, . . . , kn are device keys allocated to the access device 200-3 having the device number m in the SD method of the related art. Actually the device keys k1, . . . , kn are not provided to the access device 200-3. The reliable third party (or the storage device 100-3) computes the twisted device keys ((k'1, . . . , k'n) using the following equation (37), and provides the twisted device key to the access device 200-3 having the device number m.

$$k'i = I(m, ki) \quad (37)$$

Where I is the one-way function. The twisted device key storage 2102-3 of the access device 200-3 retains the twisted device keys and the pieces of index information (decryption key indices) corresponding to the device keys k1, . . . , kn. The twisted device keys may be stored in the twisted device key storage 2102-3 while arrayed in the order fixed by the method disclosed in JP-A 2006-253822 (KOKAI).

The key selector 2103-3 selects the twisted device key corresponding to the twisted MKB from the plural twisted device keys by the method similar to that in Step S22 of FIG. 17. The key selector 2103-3 computes the authentication key KA from the selected twisted device key.

Figure 24:
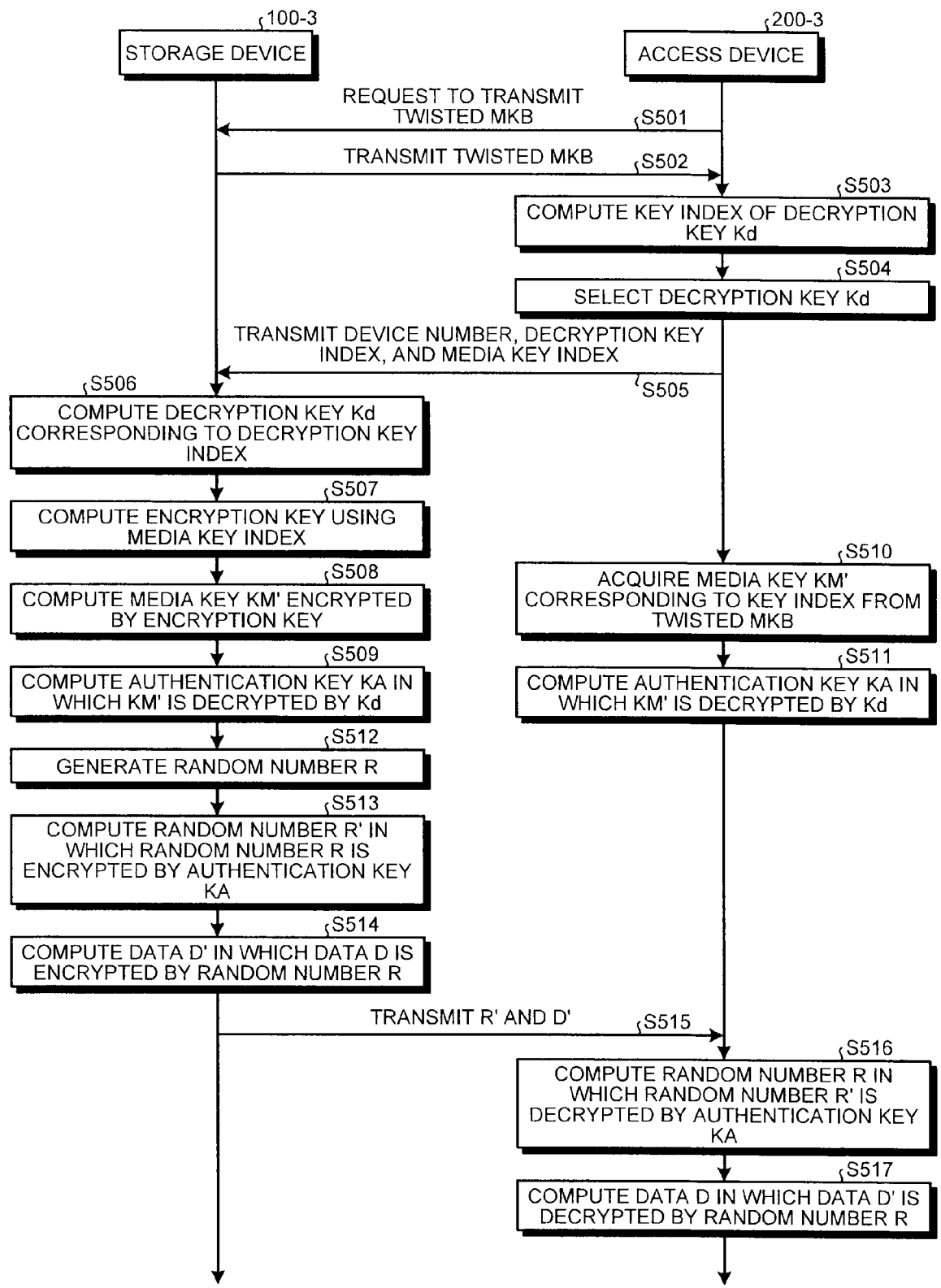
FIG. 24 is a sequence diagram of access processing of the third embodiment.

The access processing performed by the storage device 100-3 and the access device 200-3 of the third embodiment will be described below with reference to FIG. 24. FIG. 24 is a sequence diagram illustrating an entire flow of the access processing of the third embodiment.

Because Steps S501 and S502 are identical to Steps S101 and S102 of FIG. 5, the descriptions will not be repeated.

The key selector 2103-3 of the access device 200-3 acquires the index information (media key index) on the media key KM' (that should be used by the access device 200-3 and) included in the twisted MKB by the method similar to that in Step S22 of FIG. 17. The key selector 2103-3 computes the decryption key index by the method similar to that in Step S23 of FIG. 17 (Step S503). The method disclosed in JP-A 2006-253822 (KOKAI) may be used as the method for computing the decryption key index.

The key selector 2103-3 computes the decryption key Kd used to derive the authentication key KA by the method similar to that in Step S24 of FIG. 17 (Step S504). In the computing in Step S504, the twisted device key corresponding to the decryption key index is used instead of the device key in Step S24 of FIG. 17.

The access device 200-3 transmits the device number m of the access device 200-3, the decryption key index, and the media key index to the storage device 100-3 (Step S505).

In the storage device 100-3, the first computing unit 1105a-3 of the key generator 1105-3 acquires the device key ki corresponding to the received decryption key index from the device key storage 1101-3. Then the first computing unit 1105a-3 computes a twisted device key k'i, in which the device key ki is twisted using the equation (37), using the received device number m. The first computing unit 1105a-3 computes the decryption key Kd to derive the authentication key KA by the method similar to that in Step S24 of FIG. 17 (Step S506). In the computing processing in Step S506, the first computing unit 1105a-3 uses the twisted device key k'i instead of the device key in Step S24 of FIG. 17.

The second computing unit 1105b-3 computes the encryption key to encrypt the media key KM using the device key ki, the decryption key index, and the media key index (Step S507). The computing method is similar to the decryption key deriving method in Step S24 of FIG. 17. The second computing unit 1105b-3 encrypts the media key KM using the computed encryption key to obtain the media key KM' (Step S508).

The media key KM' may be computed by the above-described method. Alternatively, in the ciphertext included in the twisted MKB, the ciphertext corresponding to the device number m may be set in the media key KM' without performing the processing of computing the media key KM'.

Because Steps S509 to S517 are identical to Steps S108 to S116 of FIG. 5, the descriptions will not be repeated.

First Modification

In the third embodiment, the access device 200-3 transmits the device number of the access device 200-3, the decryption key index, and the media key index to the storage device 100-3 by way of example. Instead, the access device 200-3 may be configured to transmit the device number of the access device 200-3 and the decryption key index to the storage device 100-3. In this case, the storage device 100-3 acquires the index information (media key index) on media key KM' (that should be used by the access device 200-3 and) included in the twisted MKB stored in the general area 1111 by the method similar to that in Step S22 of FIG. 17.

Second Modification

Figure 25:
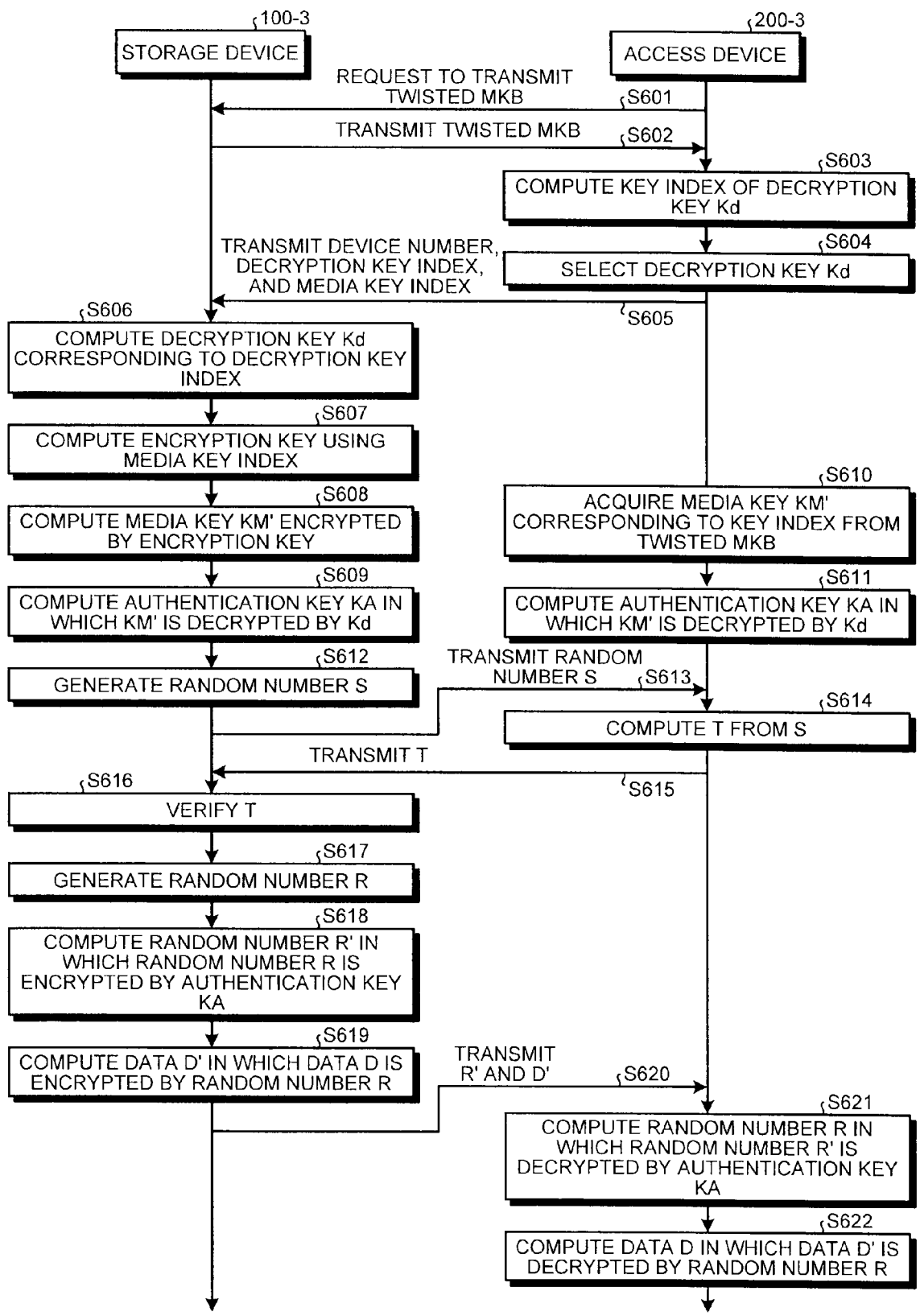
FIG. 25 is a sequence diagram of access processing according to a modification.

After computing the authentication key KA, the storage device 100-3 may verify whether the access device 200-3 retains the authentication key KA. FIG. 25 is a sequence diagram illustrating an entire flow of the access processing of the second modification. FIG. 25 differs from FIG. 24 in that the pieces of processing in Steps S612 to S616 are added.

After computing the authentication key KA, the storage device 100-3 generates a random number S (Step S612), and the storage device 100-3 transmits the random number S to the access device 200-3 (Step S613). The access device 200-3 computes the T=H(KA∥S) using the received random number S and the computed authentication key KA (Step S614), and the access device 200-3 transmits the computing result to the storage device 100-3 (Step S615). The storage device 100-3 verifies whether H(KA∥S) computed therein is matched with T received from the access device 200-3 (Step S616). When H(KA∥S) is matched with T, the storage device 100-3 continues the processing. When H(KA∥S) is not matched with T, the storage device 100-3 notifies the access device 200-3 that H(KA∥S) is not matched with T, and the processing is ended.

Third Modification

The third embodiment may be modified similarly to the case in which the first embodiment is modified to the second embodiment. That is, the SD method is used as the MKB method, and the storage device 100-3 may receive only the device number of the access device 200-3 to compute the encryption key based on the device number unlike the third embodiment. The storage device 100-3 may transmit the ciphertext corresponding to the device number m in the ciphertext included in the twisted MKB as the media key KM' to the access device 200-3, or the storage device 100-3 may transmit the whole of the twisted MKB to the access device 200-3 like the first embodiment. The access device 200-3 may acquire the twisted MKB from the third party except the storage device 100-3. In the case in which the access device 200-3 acquires the twisted MKB, the access device 200-3 computes the decryption key index using the twisted MKB and the device number of the access device 200-3.

Fourth Modification

In the third embodiment, the SD method is used as the MKB method by way of example. Alternatively, a CS (Complete Subtree) method that is of one of the MKB methods and disclosed in D. Naor, M. Naor, and J. Lotspiech: "Revocation and Tracing Schemes for Stateless Receivers," In Proc. of CRYPTO '01, LNCS 2139, Springer-Verlag, pp. 41-62, 2001 may be used.

Fourth Embodiment

Figure 26:
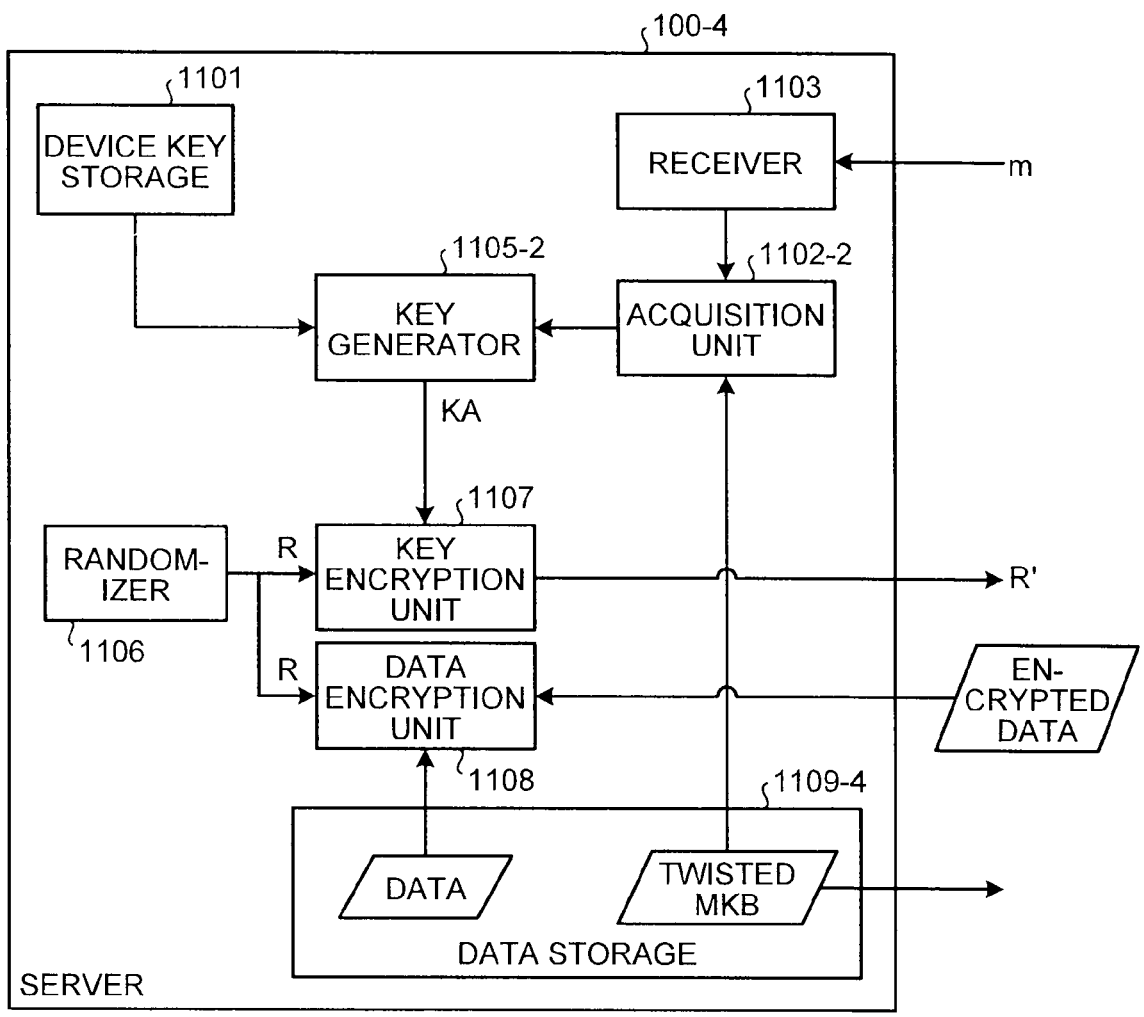
FIG. 26 is a block diagram of a server according to a fourth embodiment.
Figure 27:
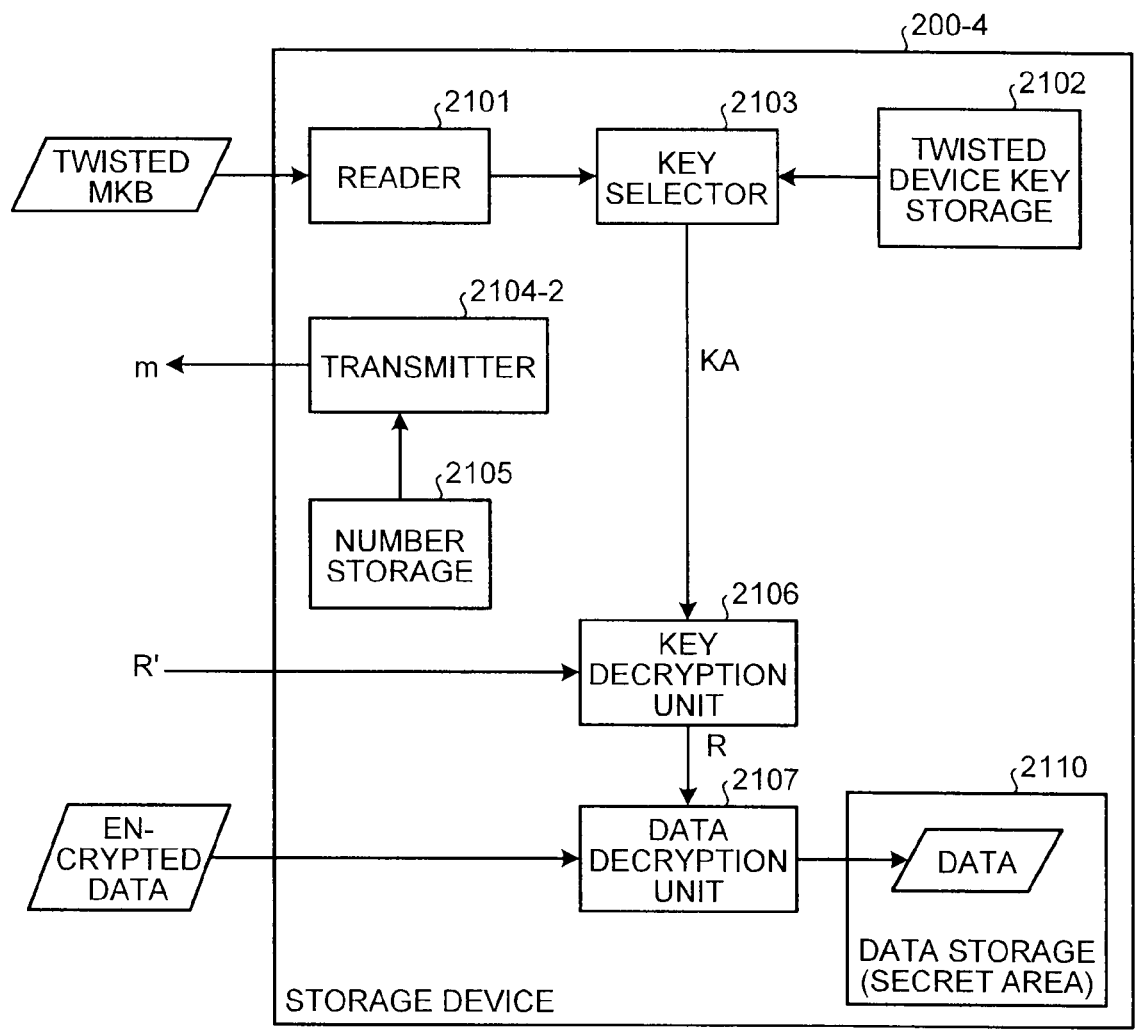
FIG. 27 is a block diagram of a storage device of the fourth embodiment.

In a fourth embodiment, a server authenticates the storage device by way of example. After authenticating the storage device, the server transmits the data to the storage device while the data is encrypted. FIG. 26 is a block diagram illustrating an example of a configuration of a server 100-4 of the fourth embodiment. FIG. 27 is a block diagram illustrating an example of a configuration of a storage device 200-4 of the fourth embodiment. For example, in the configuration of the fourth embodiment, a system includes software to download the data from the server 100-4 to the storage device 200-4.

In FIGS. 26 and 27, the unit having the same function as that of the first to third embodiments is designated by the same numeral, and the description will not be repeated. In the fourth embodiment, a data storage 1109-4 of the server 100-4 differs from the data storage 1109 in that it is not necessary for the data storage 1109-4 to include the secret area. The storage device 200-4 on the side to be authenticated (in the first to third embodiments, the access device is authenticated) includes a data storage 2110 including the secret area.

In reading the data stored in the secret area of the storage device 200-4 from the server 100-4, the reader 2101 reads the twisted MKB from the data storage 1109-4 of the server 100-4. The reader 2101 transmits an MKB index of the read twisted MKB to the key selector 2103. The key selector 2103 reads the twisted device key from the twisted device key storage 2102 to select the decryption key. The selection method is similar to that of the first embodiment. The key selector 2103 reads the key KM' that is of the base key corresponding to the suffix of the decryption key Kd from the twisted MKB read by the reader 2101. In the case in which (1,0,2,0) is the suffix of the decryption key Kd, the key selector 2103 reads the corresponding key KM'=E(PF(1,0,2,0), KM) from the twisted MKB. The key selector 2103 decrypts the key KM' using the decryption key Kd to acquire the authentication key KA (KA=D(Kd,KM')).

On the other hand, in the server 100-4, the receiver 1103 receives the device number m, which is read from the number storage 2105 of the storage device 200-4. In the fourth embodiment, similarly to the first embodiment, the expression of the device number in the ternary number becomes the expression of the route allocated to the device. The acquisition unit 1102-2 receives the device number m from the receiver 1103 to acquire (the route of) the corresponding device key. Then, similarly to the second embodiment, the acquisition unit 1102-2 obtains the decryption key index and reads the value of the base key corresponding to the base key index from the twisted MKB of the data storage 1109-4. The acquisition unit 1102-2 transmits the decryption key index, the value of the base key, and the device number to the key generator 1105-2.

The key generator 1105-2 reads the generator matrix M from the device key storage 1101 to generate the key corresponding to the decryption key index. The key generator 1105-2 acquires the authentication key KA by the procedure similar to that of the second embodiment.

The key generator 1105-2 transmits the computed authentication key KA to the key encryption unit 1107. The key encryption unit 1107 makes the request to generate the random number to the randomizer 1106 and receives the random number R generated by the randomizer 1106. The key encryption unit 1107 encrypts the random number R using the authentication key KA and transmits the encryption random number R'=E(KA,R) that is of the encrypted random number R to the storage device 200-4. On the other hand, the randomizer 1106 also transmits the random number R to the data encryption unit 1108. The data encryption unit 1108 retains the acquired random number R.

The storage device 200-4 inputs the acquired encryption random number R' to the key decryption unit 2106. The key decryption unit 2106 receives the authentication key KA from the key selector 2103 and decrypts the encryption random number R' using the authentication key KA. As a result, the random number R=D(KA,R') of the plain text is acquired. The key decryption unit 2106 retains the random number R. The storage device 200-4 makes the request to read the data D to the server 100-4. The server 100-4 reads the data D from the data storage 1109-4 and inputs the data D to the data encryption unit 1108. The data encryption unit 1108 encrypts the data D using the retained random number R to acquire the encrypted data D'=E(R,D). The data encryption unit 1108 transmits the encrypted data D' to the storage device 200-4.

The storage device 200-4 inputs the received encrypted data D' to the data decryption unit 2107. The data decryption unit 2107 receives the random number R retained by the key decryption unit 2106, and decrypts the encrypted data D' into the data D=D(R,D') using the random number R. The data decryption unit 2107 records the acquired data D in the secret area of the data storage 2110.

As described above, according to the first to fourth embodiments, even if the illegal access device (software) is distributed, the illegal leak of the data can be avoided because the illegally analyzed device can be identified.

Each of the devices (the access device, the server, and storage device of the fourth embodiment) of the embodiments includes a controller such as a CPU (Central Processing Unit), a storage device such as ROM (Read Only Memory) and RAM (Random Access Memory), a communication interface that conducts communication through a network, an external storage device such as an HDD (Hard Disk Drive) and a CD (Compact Disc) drive, a display device such as a display, an input device such as a keyboard and a mouse, and a bus that connects the devices, and the devices of the embodiments have a hardware configuration in which a usual computer is used.

A program executed in each of the devices of the embodiments is provided as a computer program product recorded in a computer-readable recording medium such as a CD-ROM (Compact Disk Read Only Memory), a flexible disk (FD), a CD-R (Compact Disk Recordable), and a DVD (Digital Versatile Disk) with a file in an installable format or an executable format.

The program executed in each of the devices of the embodiments may be configured to be stored on a computer connected to a network such as the Internet and provided by downloading the program through the network. The program executed in each of the devices of the first and second embodiments may be configured to be provided or distributed through the network such as the Internet.

The program of each embodiment may be configured to be provided while incorporated in ROM and the like.

The program executed in each of the devices of the embodiments can be configured into a module including the above-described units, and the CPU (processor) that is of the actual hardware reads the program from the recording medium to execute the program. Therefore, the each unit is loaded and generated on the main storage device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device comprising:
   a data storage in which data is stored;
   a key storage in which a plurality of device keys are stored;
   a media key storage in which a media key is stored;
   a receiver that receives identification information on an access device that accesses the data;
   an acquisition unit that acquires an index specifying one of the device keys stored in the key storage;
   a first computing unit that computes a second key based on the device key specified by the index and the identification information, the second key being different for each of the identification information; and
   a second computing unit that computes a first key by performing an operation on key information using the second key, the key information being computed based on the media key, the first key being shared with the access device.

2. The storage device according to claim 1, wherein the device keys are stored in the key storage in an a-row and b-column matrix form (a and b are integers of 2 or more), the number of the device keys stored in the key storage being a×b,
   the acquisition unit acquires the index specifying each row of the first-column to cth-column device keys (c is an integer satisfying 1<c<b), and
   the first computing unit computes the second key, in which a value computed from the device key of the row specified by the index of each of the first to the cth columns is twisted using the identification information.

3. The storage device according to claim 2, wherein the first computing unit computes the second key, which is acquired by inputting the value computed from the device key of the row specified by the index of each of the first to the cth columns and the identification information to a one-way function.

4. The storage device according to claim 1, wherein the device key correlated with a combination of nodes included in a tree structure of an SD (Subset Difference) method is stored in the key storage,
   the acquisition unit acquires the index specifying the combination of the nodes, and
   the first computing unit computes the second key by the SD method using a twisted device key in which the device key correlated with the combination of the nodes specified by the index is twisted using the identification information.

5. The storage device according to claim 4, wherein the first computing unit computes the second key using the twisted device key, which is acquired by inputting the device key correlated with the combination of the nodes specified by the index and the identification information to a one-way function.

6. The storage device according to claim 1, wherein the acquisition unit acquires the index corresponding to the received identification information from a table in which the plurality of pieces of identification information on the access devices and the indexes are stored while correlated with each other.

7. The storage device according to claim 1, wherein the acquisition unit acquires the index transmitted from the access device.

8. A program product having a non-transitory computer readable medium including programmed instructions, wherein the instructions, when executed by a computer having a data storage in which data is stored, a key storage in which a plurality of device keys are stored, and a media key storage in which a media key is stored, cause the computer to perform:
   receiving identification information on an access device that accesses the data;
   acquiring an index specifying one of the device keys stored in the key storage;
   computing a second key based on the device key specified by the index and the identification information, the second key being different for each of the identification information; and
   computing a first key by performing an operation on key information using the second key, the key information being computed based on the media key, the first key being shared with the access device.

9. An access device that accesses a storage device in which data and a plurality of device keys are stored, the access device comprising:
   a key storage in which a plurality of twisted device keys are stored, each of the plurality of device keys being twisted into the twisted device key using identification information on the access device;
   a key selector that selects one of the twisted device keys from the plurality of twisted device keys through a media key block processing and computes a first key shared with the storage device based on the selected twisted device key; and
   a transmitter that transmits the identification information and an index specifying one of a plurality of device keys stored in the storage device to the storage device.

10. A program product having a non-transitory computer readable medium including programmed instructions, wherein the instructions, when executed by a computer having a key storage in which a plurality of twisted device keys are stored, each of a plurality of device keys being twisted into the twisted device key using identification information on an access device, cause the computer to perform:
    selecting one of the twisted device keys from the plurality of twisted device keys through a media key block processing and computes a first key shared with a storage device based on the selected twisted device key; and
    transmitting the identification information and an index specifying one of a plurality of device keys stored in the storage device to the storage device.

11. A storing method comprising:
- receiving identification information on an access device that accesses data stored in a data storage;
- acquiring an index specifying one of a plurality of device keys stored in a key storage;
- computing a second key based on the device key specified by the index and the identification information, the second key being different for each of the identification information; and
- computing a first key by performing an operation on key information using the second key, the key information being computed based on a media key stored in a media key storage, the first key being shared with the access device.

12. The storing method according to claim 11, wherein the device keys are stored in the key storage in an a-row and b-column matrix form (a and b are integers of 2 or more), the number of the device keys stored in the key storage being a×b,
- acquiring includes
  - acquiring the index specifying each row of the first-column to cth-column device keys (c is an integer satisfying 1<c<b), and
- computing the second key includes
  - computing the second key, in which a value computed from the device key of the row specified by the index of each of the first to the cth columns is twisted using the identification information.

13. The storing method according to claim 11, wherein computing the second key includes
- computing the second key, which is acquired by inputting the value computed from the device key of the row specified by the index of each of the first to the cth columns and the identification information to a one-way function.

14. The storing method according to claim 11, wherein the device key correlated with a combination of nodes included in a tree structure of an SD (Subset Difference) method is stored in the key storage,
- acquiring includes
  - acquiring the index specifying the combination of the nodes, and computing the second key includes
  - computing the second key by the SD method using a twisted device key in which the device key correlated with the combination of the nodes specified by the index is twisted using the identification information.

15. The storing method according to claim 14, wherein computing the second key includes
- computing the second key using the twisted device key, which is acquired by inputting the device key correlated with the combination of the nodes specified by the index and the identification information to a one-way function.

16. The storing method according to claim 11, wherein acquiring includes
- acquiring the index corresponding to the received identification information from a table in which the plurality of pieces of identification information on the access devices and the indexes are stored while correlated with each other.

17. The storing method according to claim 11, wherein acquiring includes acquiring the index transmitted from the access device.

18. An access method that accesses a storage device in which data and a plurality of device keys are stored, comprising:
- selecting one of twisted device keys from a plurality of twisted device keys through a media key block processing and computing a first key shared with the storage device based on the selected twisted device key, the plurality of twisted device keys being stored in a key storage, each of the plurality of device keys being twisted into the twisted device key using identification information on an access device; and
- transmitting the identification information and an index specifying one of a plurality of device keys stored in the storage device to the storage device.

* * * * *